United States Patent
Suresh et al.

(10) Patent No.: US 10,613,496 B2
(45) Date of Patent: Apr. 7, 2020

(54) SUPPORT STRUCTURE CONSTRAINED TOPOLOGY OPTIMIZATION FOR ADDITIVE MANUFACTURING

(71) Applicant: Wisconsin Alumni Research Foundation, Madison, WI (US)

(72) Inventors: Krishnan Suresh, Middleton, WI (US); Amirmassoud Mirzendehdel, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 387 days.

(21) Appl. No.: 15/269,264

(22) Filed: Sep. 19, 2016

(65) Prior Publication Data

US 2018/0079149 A1    Mar. 22, 2018

(51) Int. Cl.
| | |
|---|---|
| *B29C 64/386* | (2017.01) |
| *B29C 64/40* | (2017.01) |
| *G05B 17/02* | (2006.01) |
| *B33Y 50/00* | (2015.01) |

(52) U.S. Cl.
CPC .......... *G05B 17/02* (2013.01); *B29C 64/386* (2017.08); *B29C 64/40* (2017.08); *B33Y 50/00* (2014.12); *G05B 2219/49023* (2013.01)

(58) Field of Classification Search
None
See application file for complete search history.

(56) References Cited

U.S. PATENT DOCUMENTS

| | | | |
|---|---|---|---|
| 8,355,893 B2 * | 1/2013 | Suresh | G06F 17/5018 700/98 |
| 2006/0276925 A1 * | 12/2006 | Lin | A61F 2/30942 700/118 |
| 2015/0190971 A1 * | 7/2015 | Musuvathy | B29C 64/386 700/98 |
| 2015/0360288 A1 * | 12/2015 | Zalewski | B29C 64/153 419/38 |
| 2017/0176975 A1 * | 6/2017 | Pedersen | G05B 19/4099 |
| 2017/0232515 A1 * | 8/2017 | DeMuth | B33Y 10/00 419/53 |
| 2017/0312986 A1 * | 11/2017 | Qian | G06F 7/00 |

OTHER PUBLICATIONS

Krishnan Suresh et al., "Large-scale modal analysis on multi-core architectures," ASME 2012 International Design Engineering Technical Conferences and Computers and Information in Engineering Conference, Chicago IL, USA, Aug. 12-15, 2012, 7 pages, American Society of Mechanical Engineers.

(Continued)

*Primary Examiner* — Jason D Mitchell
(74) *Attorney, Agent, or Firm* — Quarles & Brady LLP

(57) ABSTRACT

Systems and methods for generating designs of objects for additive manufacturing (AM) include a topological optimization framework that facilitates optimized computer generated designs requiring significantly reduced support structures. Towards this end, the concept of 'support structure topological sensitivity' is introduced. This is combined with performance sensitivity to result in a TO framework that maximizes performance, subject to support structure constraints. The robustness and efficiency of the proposed method is demonstrated through numerical experiments, and validated through fused deposition modeling, a popular AM process.

20 Claims, 18 Drawing Sheets

(56) References Cited

OTHER PUBLICATIONS

Yuejun Jiang et al., "Solving problems with hard and soft constraints using a stochastic algorithm for MAX-SAT," 1st International Joint Workshop on Artificial Intelligence and Operations Research, Timberline, Oregon, 1995, pp. 1-15.

A. A. Novotny et al., "Topological-shape sensitivity method: Theory and Applications," Solid Mechanics and its Applications, 2006, 10 pages, vol. 137.

Jan Sokolowski et al., "On Topological Derivative in Shape Optimization," Institut National de Recherche en Informatique et en Automatique, May 1997, pp. 1-31.

A. A. Novotny et al., "Topological sensitivity analysis for three-dimensional linear elasticity problem," Computer Methods in Applied Mechanics and Engineering, Sep. 7, 2005, pp. 1-14.

Inna Turevsky et al., "Generalization of topological sensitivity and its application to defeaturing," ASME 2007 International Design Engineering Technical Conferences and Computers and Information in Engineering Conference, American Society of Mechanical Engineers, Sep. 4-7, 2007, pp. 335-344.

Feijóo, R. A. et al., "The Topological-Shape Sensitivity Method in two-dimensional linear elasticity topology design," Journal of Computational Methods in Sciences and Engineering, Applications of Computational Mechanics in Structures and Fluids, 2005, pp. 1-15, Cambridge International Science Publishing.

Krishnan Suresh et al., "Stress-constrained topology optimization: a topological level-set approach," Structural and Multidisciplinary Optimization, DOI 10.1007/s00158-013-0899-4, Mar. 9, 2013, pp. 295-309, vol. 48, No. 2, Springer.

Krishnan Suresh, "A 199-line Matlab code for Pareto-optimal tracing in topology optimization," Structural and Multidisciplinary Optimization, Nov. 2010, pp. 665-679, vol. 42, Issue 5.

Krishnan Suresh, "Efficient Generation of Large-Scale Pareto-Optimal Topologies," Structural and Multidisciplinary Optimization, Jan. 2013, pp. 49-61, vol. 47, Issue 1.

W. E. Lorensen et al., "Marching cubes: A High Resolution 3D Surface Reconstruction Algorithm," ACM Computer Graphics, Jul. 1987, pp. 163-169, vol. 21, No. 4.

Jorge Nocedal et al., "Numerical optimization," Mathematics Subject Classification, Springer Science, 1999, 651 pages, Springer.

Hans A. Eschenauer et al., "Topology optimization of continuum structures: A review*," Applied Mechanics Review, Jul. 2001, pp. 331-390, vol. 54, No. 4, American Society of Mechanical Engineers.

George I. N. Rozvany, "A critical review of established methods of structural topology optimization," Structural and Multidisciplinary Optimization, DOI 10.1007/s00158-007-0217-0, Feb. 21, 2008, 21 pages, vol. 37, Issue 3, Springer-Verlag.

Martin P. Bendsoe et al., "Topology Optimization—Theory, Methods, and Applications," Springer Science & Business Media, Oct. 7, 2003, pp. 1-6, Springer.

E. Kesseler et al., "Multidisciplinary design analysis and multi-objective optimisation applied to aircraft wing," WSEAS Transactions on Systems and Control, ISSN 1991-8763, Dec. 2006, pp. 1-21, vol. 1, Issue 2, National Aerospace Laboratory NLR.

J. J. Alonso et al., "Aircraft Design Optimization," Computational Science Research Center Computing Group, CSRCR2007-13, May 2007, 18 pages.

V. H. Coverstone-Carrol et al., "Optimal multi-objective low-thrust spacecraft trajectories," Computer Methods in Applied Mechanics and Engineering, 2000, pp. 387-402, vol. 186.

L. Wang et al., "Automobile body reinforcement by finite element optimization," Finite Elements in Analysis and Design, 2004, pp. 879-893, vol. 40, No. 8.

L. Harzheim et al., "A review of optimization of cast parts using topology optimization II-Topology optimization with manufacturing constraints," Structural and Multidisciplinary Optimization, May 2006, pp. 388-399, vol. 31, No. 5.

G. K. Ananthasuresh et al., "A methodical approach to the design of compliant micromechanisms," Solid-State Sensor and Actuator Workshop, Jun. 13-16, 1994, pp. 189-192, Transducers Research Foundation.

Shinji Nishiwaki et al., "Topology optimization of compliant mechanisms using the homogenization method," International Journal for Numerical Methods in Engineering, Dec. 4, 1998, pp. 535-559, vol. 42, John Wiley & Sons, Ltd.

T. E. Bruns et al., "Topology optimization of non-linear elastic structures and compliant mechanisms," Computer methods in applied mechanics and engineering, Mar. 16, 2001, pp. 3443-3459, vol. 190, No. 26-27.

Z. Luo et al., "Compliant mechanism design using multi-objective topology optimization scheme of continuum structures," Structural and Multidisciplinary Optimization, DOI 10.1007/s00158-004-0512-y, Mar. 18, 2005, pp. 142-154, vol. 30, Springer-Verlag.

I. Gibson et al., "Additive Manufacturing Technologies," 2010, Springer.

H. Lipson et al., "Fabricated: The New World of 3D Printing," 2013, John Wiley & Sons.

D. Brackett et al., "Topology optimization for additive manufacturing," in 22nd Annual International Solid Freeform Fabrication Symposium, Austin, TX, Aug. 17, 2011, pp. 348-362.

Ercan M. Dede et al., "Topology optimization, additive layer manufacturing, and experimental testing of an air-cooled heat sink," Journal of Mechanical Design, DOI: 10.1115/1.4030989, Nov. 2015, pp. 111702-1-111702-9, vol. 137, American Society of Mechanical Engineers.

M. Leary et al., "Optimal topology for additive manufacture: A method for enabling additive manufacture of support-free optimal structures," Materials & Design, Nov. 2014, pp. 678-690, vol. 63.

Kurt Maute et al., "Level set topology optimization of printed active composites." Journal of Mechanical Design, DOI: 10.1115/1.4030994, Nov. 2015, pp. 111402-1-111402-13, vol. 137, American Society of Mechanical Engineers.

A. T. Gaynor et al., "Topology optimization for additive manufacturing: Considering maximum overhang constraint," Presented at the 15th AIAA/ISSMO Multidisciplinary Analysis and Optimization Conference, Atlanta, GA, 2014, pp. 16-20.

Douglas S. Thomas et al., "Costs and Cost Effectiveness of Additive Manufacturing: A Literature Review and Discussion," NIST Special Publication 1176, Dec. 2014, 89 pages. URL: http://dx.doi.org/10.6028/NIST.SP.1176.

Jibin Zhao et al., "Determination of Optimal Build Orientation Based on Satisfactory Degree Theory for RPT," in Ninth International Conference on Computer Aided Design and Computer Graphics, Dec. 7-10, 2005, 16 pages.

P. M. Pandey et al., "Optimal part deposition orientation in FDM by using a multicriteria genetic algorithm," International Journal of Production Research, Oct. 2004, pp. 4069-4089, vol. 42, No. 19, Taylor and Francis Ltd.

A. S. Nezhad et al., "Pareto-based optimization of part orientation in stereolithography," Proceedings of the Institution of Mechanical Engineers, Part B, Journal of Engineering Manufacture, Oct. 2010, pp. 1591-1598, vol. 224, No. 10.

Ratnadeep Paul et al., "Optimization of layered manufacturing process for reducing form errors with minimal support structures," Journal of Manufacturing Systems, Jul. 2015, pp. 231-243, vol. 36.

Paramita Das et al., "Optimum part build orientation in additive manufacturing for minimizing part errors and support structures," Procedia Manufacturing, doi: 10.1016/j.promfg.2015.09.041, 2015, pp. 343-354, vol. 1, Elsevier B.V.

Xiaotin Zhang et al. "Perceptual Models of Preference in 3D Printing Direction," ACM Transactions on Graphics, Nov. 2015, pp. 1-12, vol. 34, No. 6, Article 215.

Nobuyuki Umetani et al., "Cross-sectional Structural Analysis for 3D Printing Optimization," SIGGRAPH Asia, 2013, 4 pages, vol. 5.

J. Vanek et al., "Clever Support: Efficient Support Structure Generation for Digital Fabrication," Computer Graphics Forum, DOI: 10.1111/cgf.12437, 2014, pp. 117-125, vol. 33, No. 5, The Eurographics Association and John Wiley & Sons Ltd.

(56) References Cited

OTHER PUBLICATIONS

Eric Barnett et al., "Weak Support Material Techniques for Alternative Additive Manufacturing Materials," Additive Manufacturing, Jun. 23, 2015, pp. 1-13.
Jérémie Dumas et al., "Bridging the Gap: Automated Steady Scaffoldings for 3D Printing," ACM Transactions on Graphics, Jul. 2014, 10 pages, vol. 33, No. 4, Article No. 98.
A. Gebhardt, "Additive manufacturing design and strategies," Understanding Additive Manufacturing, Nov. 2011, pp. 103-128, Carl Hanser Verlag GmbH & Co. KG.
I. Gibson et al., "Design Rules for Additive Manufacture," in International Solid Free Form Fabrication Symposium, Austin, TX, Aug. 9-11, 2010, pp. 705-716, University of Texas.
Ligang Liu et al., "3D Printing Oriented Design: Geometry and Optimization" Siggraph Asia 2014 Course, SIGGRAPH Asia 2014 Shenzhen, Dec. 5, 2014, 49 pages. URL: http://staff.ustc.edu.cn/~lgliu/Courses/SigAsia_2014_course_3Dprinting/index.html.
Carolyn Conner Seepersad et al. "A designers guide for dimensioning and tolerancing SLS parts," in Solid Freeform Fabrication Symposium, Austin, TX, 2012, pp. 921-931.
Christopher B. Williams et al., "Design for additive manufacturing curriculum: A problem-and project-based approach," in International solid freeform fabrication symposium, Austin, TX, 2012, pp. 81-92.
Ming Zhou et al., "Progress in topology optimization with manufacturing constraints," Ninth AIAA/ISSMO Symposium on Multidisciplinary Analysis and Optimization, Atlanta, GA, Sep. 4-6, 2002, 8 pages.
Qi Xia et al. "Simultaneous optimization of cast part and parting direction using level set method," Structural and Multidisciplinary Optimization, DOI 10.1007/s00158-011-0690-3, Aug. 10, 2011, pp. 751-759, vol. 44, Springer-Verlag.
Weiming Wang et al., "Cost-effective Printing of 3D Objects with Skin-Frame Structures," ACM Transactions on Graphics, Nov. 2013, pp. 1-10, vol. 32 No. 6, Article 177.
Kailun Hu et al., "Support Slimming for Single Material Based Additive Manufacturing," Computer-Aided Design 65, Mar. 2, 2015, pp. 1-11.

O. Sigmund, "A 99 line topology optimization code written in Matlab," Structural and Multidisciplinary Optimization, 2001, pp. 120-127, vol. 21, Springer-Verlag.
A. Rietz, "Sufficiency of a finite exponent in SIMP (power law) methods," Structural and Multidisciplinary Optimization, Apr. 2001, pp. 159-163, vol. 21, Issue 2.
Jianbin Du et al., "Topology optimization of continuum structures with respect to simple and multiple eigenfrequencies," Sixth World Congresses of Structural and Multidisciplinary Optimization, May 30-Jun. 3, 2005, pp. 1-9, Rio de Janeiro, Brazil.
M. Zhou et al., "The COC algorithm, Part II: topological, geometrical and generalized shape optimization," Computer Methods in Applied Mechanics and Engineering, Aug. 1991, pp. 309-336, vol. 89.
Grégoire Allaire et al., "A level-set method for vibration and multiple loads structural optimization," Computer Methods in Applied Mechanics and Engineering,, Jun. 23, 2004, pp. 1-28.
Michael Yu Wang et al, "A level set method for structural topology optimization," Computer Methods in Applied Mechanics and Engineering, Jan. 2003, pp. 227-246, vol. 192.
X. Wang et al., "Structural shape and topology optimization in a level-set-based framework of region representation," Structural and Multidisciplinary Optimization, DOI 10.1007/s00158-003-0363-y, May 2004, pp. 1-19, vol. 27.
X. Huang et al., "A new look at ESO and BESO optimization methods, " Structural and Multidisciplinary Optimization, DOI: 10.1007/s00158-007-0140-4, May 17, 2007, pp. 89-92, vol. 35, Springer-Verlag.
Krishnan Suresh, "Tracing Pareto-Optimal Frontiers in Topology Optimization," ASME 2010 International Design Engineering Technical Conferences and Computers and Information in Engineering Conference, Montreal, Quebec, Canada, Aug. 15-18, 2010, 10 pages, American Society of Mechanical Engineers.
Inna Turevsky et al., "Tracing the envelope of the objective-space in multi-objective topology optimization," ASME 2011 International Design Engineering Technical Conferences and Computers and Information in Engineering Conference, Washington DC, USA, Aug. 28-31, 2011, pp. 805-813, American Society of Mechanical Engineers.

\* cited by examiner

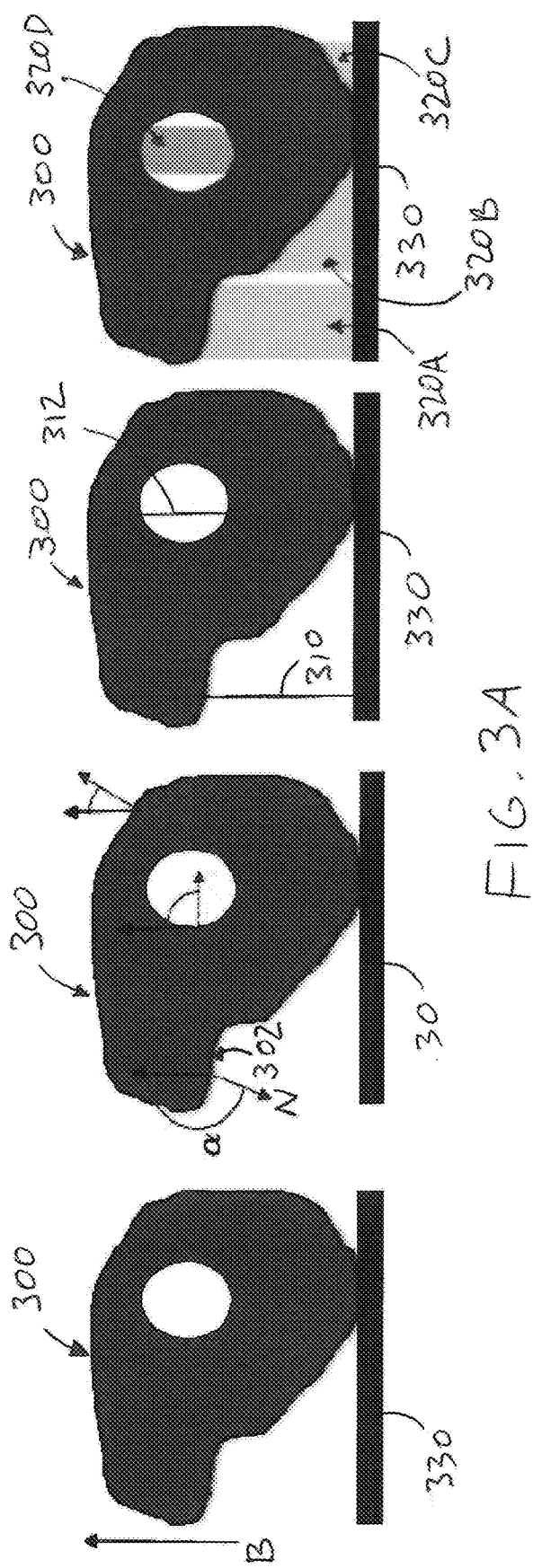

FIG. 10A
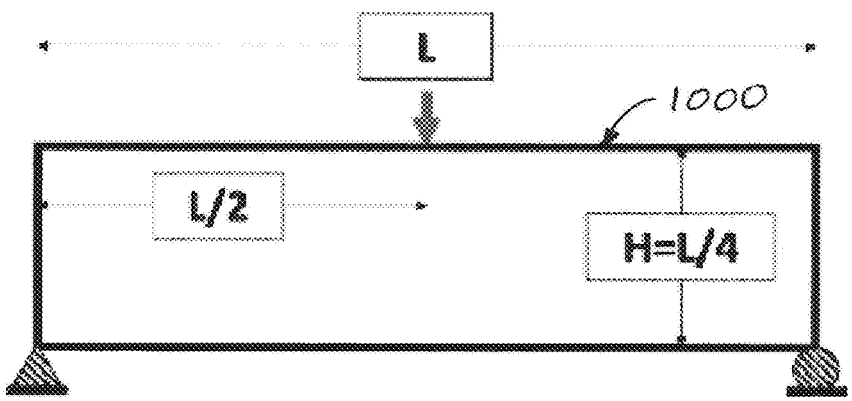
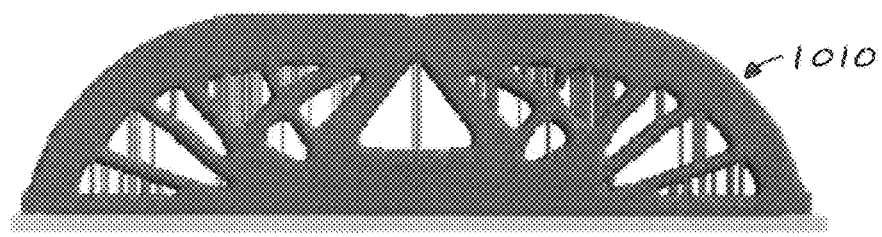
FIG. 10B
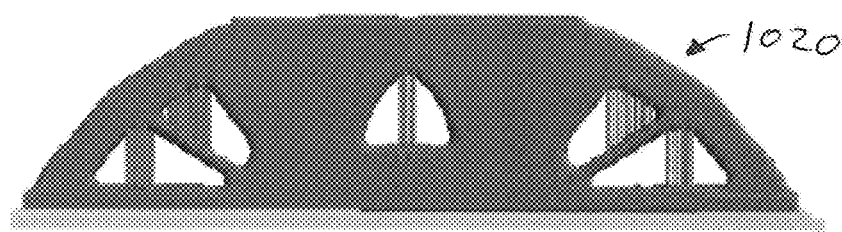
FIG. 10C
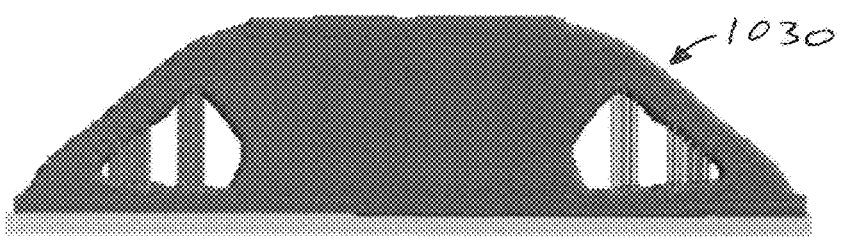
FIG. 10D
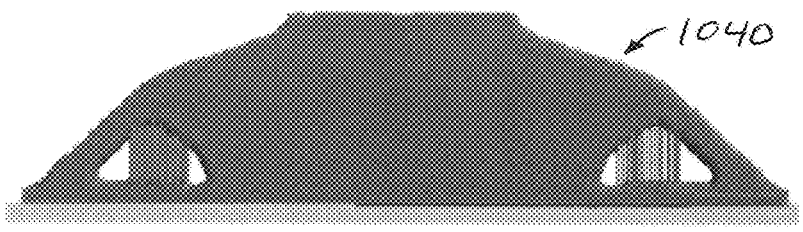
FIG. 10E

SUPPORT STRUCTURE CONSTRAINED TOPOLOGY OPTIMIZATION FOR ADDITIVE MANUFACTURING

STATEMENT REGARDING FEDERALLY SPONSORED RESEARCH

This invention was made with government support under 1500205 awarded by the National Science Foundation. The government has certain rights in the invention.

BACKGROUND OF THE INVENTION

This disclosure relates generally to methods of optimizing designs, and more specifically to methods for designing structures that are optimized for manufacture with additive manufacturing processes.

Additive manufacturing (AM) processes are processes for fabricating parts through material addition. Specifically, AM devices manufacture three-dimensional objects by adding layer-upon-layer of material in the "build direction" (e.g., from the bottom to the top of the object). The growing interest in AM stems from its ability to fabricate highly complex parts with relative ease. However, structures built with AM must observe certain limitations of the AM processes. Polymer AM processes work with melted, partially melted, and/or amorphous materials, and unsolidified portions of layers can droop or creep where there is no underlying material providing support. The same "overhanging" portions can be damaged by burning during metal AM processes. Thus, overhanging portions of the structure require support structures to hold the overhanging portions in place during manufacture. These support structures are "sacrificial"—they are made of the same material as the structure being manufactured, and are removed after fabrication.

Support structures directly add to the build-time and material cost. Material costs can be substantial in AM; for example, the largest percentage cost for metal AM, besides the machine cost that is amortized, is material cost (18%). Further, support structures can be hard to remove (and sometimes even inaccessible), leading to the post-fabrication (clean-up) cost. Post-fabrication costs make-up for about 8% of AM product cost.

Topology optimization (TO) represents a class of computational methods for designing lightweight, high-performance structures. After several years of intensive research, it has emerged as a powerful design tool, and is deployed in optimization of aircraft components, spacecraft modules, automobile components, cast components, compliant mechanisms, etc. The overarching goal of TO is to start with a given design that meets specifications for rigidity, load bearing, force resistance, etc., and reduce it to an optimized design that is lighter in weight and uses the least amount of material while meeting the same specifications. Designs stemming from TO are geometrically complex, and therefore hard to manufacture using traditional processes, but these designs can often be additively manufactured. Also, since fabrication cost in AM is proportional to the material used, light-weight topology optimized designs are particularly relevant in AM. In theory, these and other characteristics make TO and AM well suited for each other. However, in practice, topologically optimized designs are often not AM friendly. One drawback is that TO processes, seeking the lightest-weight solution, create structures with many overhanging portions; this drives up the manufacturing costs due to the additional support structures needed.

Imposing manufacturing constraints in TO has been addressed before; a particularly relevant constraint is that of 'draw-direction constraint' for casting, where the TO algorithm was modified so as to avoid 'inserts'. While this is analogous to the support structure constraint, there are two fundamental differences: (1) support structures are governed by a threshold angle, while the threshold angle for draw-direction is essentially zero, and (2) the draw-direction constraint is bidirectional, while the build-direction in AM is unidirectional. Thus, the draw-direction methodology does not apply to AM; novel methods are needed.

One approach to minimizing support structures proposes a penalization scheme on overhanging surfaces, and an edge analysis was carried out on a benchmark 2D example. The overhang constraint was suggested but not demonstrated. Another approach proposed a novel strategy to reduce the material cost by first extracting the frame structure of the design. However, the frame is in fact the solution of a multi-objective TO problem that minimizes the number of struts while considering stability and printability. Another proposal introduced the idea of self-supporting designs, where the TO optimized design was altered to include features similar to support structures. In other words, support structures were introduced as design features a posteriori. Since this is carried out after TO, the structural load path is altered, and may violate stress and other performance constraints.

Recently, another approach employed a smooth Heaviside approximation to penalize overhanging surfaces within a Solid Isotropic Material with Penalization (SIMP)-based TO. The approach demonstrated that, for 2D compliance minimization, this scheme changes the topology to be AM friendly. Specifically, it is possible to eliminate support structures by suitably changing the TO process. The results are encouraging, but there arose convergence issues when the overhanging penalization was imposed. A contemporaneous approach proposed a shape optimization technique to alter the model to a more self-supported one. To this end, once a volumetric tetrahedral mesh is generated, the overhang tetrahedra are mapped onto the Gauss sphere and minimally rotated to a self-supported state.

While there have been some significant research activities in TO and AM, a robust framework for integrating the two is lacking. Therefore, the purpose of this disclosure is to provide a TO methodology for limiting the support structure volume, thereby leading to designs that are AM friendly.

SUMMARY OF THE INVENTION

The present invention overcomes the aforementioned drawbacks by providing systems and processes for additive manufacturing using a topology optimization (TO) framework that generates designs that have significantly reduced support structure requirements during manufacture. The TO framework may be implemented in design software, such as computer-aided drafting software, to speed up the design and engineering processes and avoid manual iterative design processes.

In one aspect, the disclosure provides a method for optimizing an object for additive manufacturing, the object having a first volume of material. The method includes: receiving electronic data comprising a first design of the object; receiving a support constraint parameter having a value between zero and one; determining a first support volume of a first number of support structures required to support the object during the additive manufacturing, in a build direction, of the object from the first design; performing a first topological optimization of the first design, the first topological optimization being unconstrained as to support volume, to produce a first unconstrained optimized design, the object in the first unconstrained optimized design comprising a first fractional volume of material that is less than the first volume of material; determining a first unconstrained support volume of a second number of support structures required to support the object during the additive manufacturing, in the build direction, of the object from the first unconstrained optimized design; computing a first topological sensitivity, for a performance of the object, to each of one or more topological changes between the first design and the first unconstrained optimized design; computing a second topological sensitivity, for a support structure volume required to perform the additive manufacturing of the object in the build direction, to each of the one or more topological changes between the first design and the first unconstrained optimized design; computing, from the first topological sensitivity and the second topological sensitivity, a first augmented topological field; and, performing a fixed-point iteration of the first design based on the first augmented topological field to produce a first intermediate design of a plurality of intermediate designs, wherein the first intermediate design comprises the first fractional volume of material and has a first optimized support volume less than or equal to the first unconstrained support volume multiplied by the support constraint parameter.

Computing the second topological sensitivity may include, for each of the one or more topological changes between the first design and the first unconstrained optimized design, determining a corresponding change to the support structure volume at each point of a plurality of points within the first design that have a corresponding surface normal disposed at an angle from the build direction that exceeds a threshold angle. Computing the second topological sensitivity may further include smoothing the second topological sensitivity based on a horizontal overhang distance of each overhang of one or more overhangs in the first design.

Computing the first augmented topological field may further include combining a first sensitivity field corresponding to the first topological sensitivity with a second sensitivity field corresponding to the second topological sensitivity according to an augmented Lagrangian method to produce the first augmented topological field. The method may further include: receiving a target fractional volume that is less than the first fractional volume; performing the first topological optimization of the first unconstrained optimized design to produce a second unconstrained optimized design, the object in the first unconstrained optimized design comprising the target fractional volume of material; determining a second unconstrained support volume of a third number of support structures required to support the object during the additive manufacturing, in the build direction, of the object from the second unconstrained optimized design; computing a third topological sensitivity, for a performance of the object, of the first intermediate design to each of one or more proposed topological changes; computing a fourth topological sensitivity, for a support structure volume required to perform the additive manufacturing of the object in the build direction, of the first intermediate design to each of the one or more proposed topological changes; computing, from the third topological sensitivity and the fourth topological sensitivity, a second augmented topological field; and performing a fixed-point iteration of the first intermediate design based on the second augmented topological field to produce a final optimized design comprising the target fractional volume of material and having a final optimized support volume less than or equal to the second unconstrained support volume multiplied by the support constraint parameter.

In another aspect, the present disclosure provides a computing device that includes memory storing device logic, and a processor in communication with the memory and executing the device logic to: receive an initial design of an object, the object having an initial volume of material in the initial design; and iterate a topological optimization of the initial design to produce a plurality of iterative designs of the object, the plurality of iterative designs including a final optimized design in which the object comprises a final volume of material that is a target fraction of the initial volume of material, wherein each of the iterative designs has a corresponding support volume of support structures required to support the object during additive manufacturing of the object from the iterative design, the corresponding support volume constrained according to a support constraint parameter.

In another aspect, the present disclosure provides a method for optimizing an object for additive manufacturing, the method including: receiving an initial design of an object, the object having an initial volume of material in the initial design; and, iterating a topological optimization of the initial design to produce a plurality of iterative designs of the object, the plurality of iterative designs including a final optimized design in which the object comprises a final volume of material that is a target fraction of the initial volume of material, wherein each of the iterative designs has a corresponding support volume of support structures required to support the object during additive manufacturing of the object from the iterative design, the corresponding support volume constrained according to a support constraint parameter.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 3A is a diagram showing the identification of support structures and support volumes for an initial design.

FIG. 10A is a diagram of a Messerschmidt-Bölkow-Blohm (MBB) beam.

FIG. 10B is a computer-simulated diagram of an unconstrained topographical optimization of the MBB beam.

FIGS. 10C-E are computer-simulated diagrams of support volume sensitive topographical optimizations of the MBB beam using different support constraints.

DETAILED DESCRIPTION OF THE INVENTION

Described here are systems and computer-implemented methods for generating designs for additive manufacturing (AM) that are topologically optimized according to a topological optimization (TO) process that maximizes performance, subject to support structure constraints. Example design results and descriptions of fused deposition models are provided to demonstrate the robustness and efficiency of the disclosed systems and processes. The systems and methods can be implemented as an enhancement to existing computer-aided drafting (CAD) software to speed up the design and engineering process, which is typically done manually and iteratively. The systems and methods can also result in better optimization than the manual approach.

Figure 1:
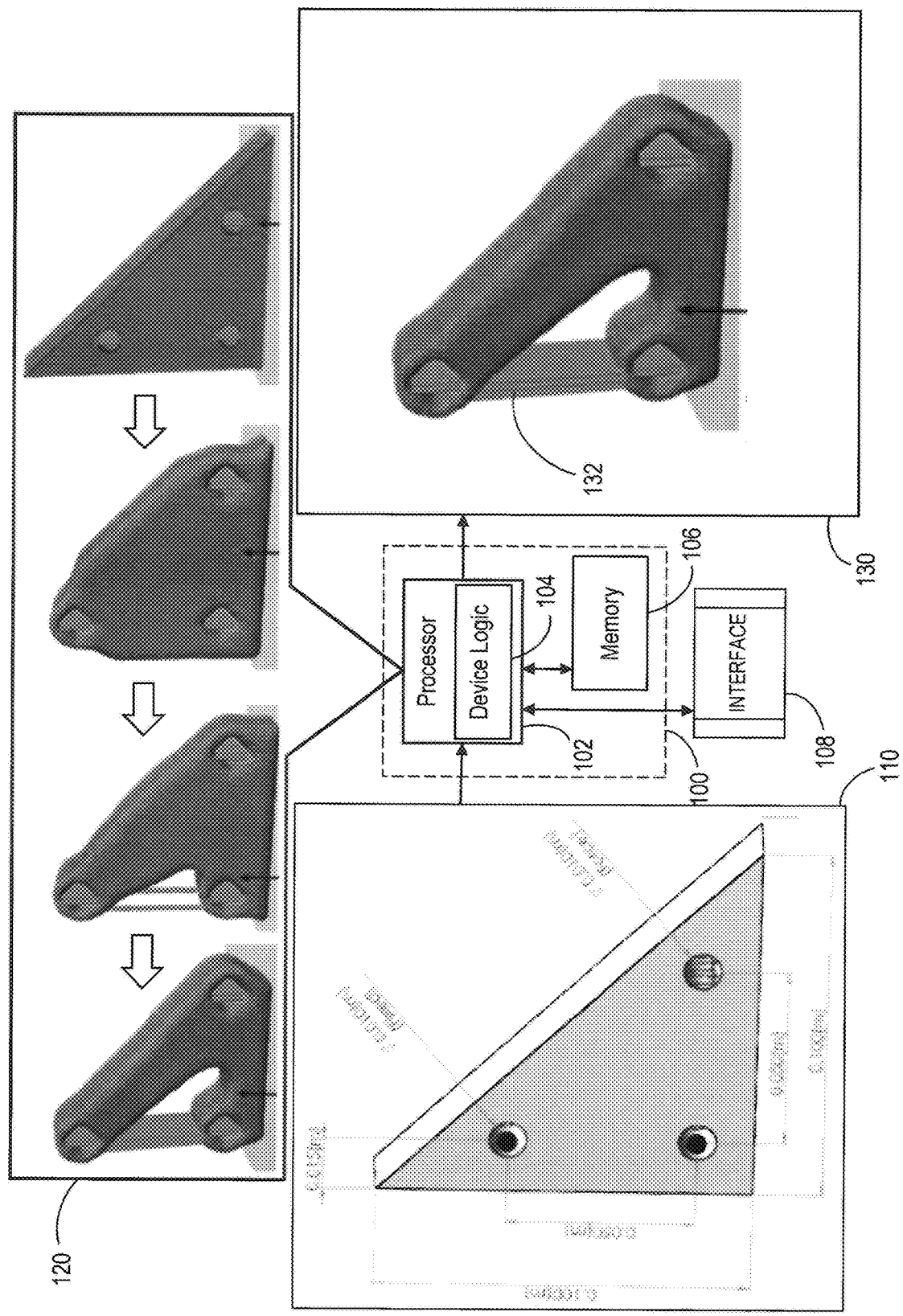
FIG. 1 is a diagram of an example system configured to transform an initial design into an optimized design according to a support volume sensitive topological optimization framework, in accordance with the present disclosure.

FIG. 1 illustrates an exemplary system for optimizing a design of an object according to a support volume sensitive TO framework. A computing device 100 includes a processor 102 that executes device logic 104 within the processor 102 or contained in memory 106 of the computing device 100. The device logic 104 configures the processor 102 to perform the processes described herein. The computing device 100 may be a server computer or a system of interconnected server computers, such as a web server, application server, application platform, virtual server, cloud data server, and the like, or a personal computer, laptop computer, tablet computer, e-reader, smartphone, personal data assistant, microconsole, industrial automation system, or similar computing device having, as the processor 102, a central processing unit (CPU), microprocessor, or other suitable processor. In some embodiments, the device logic 104 and/or memory 106 may store program instructions and other data for a computer-aided drafting (CAD) program, or another suitable program, for creating, modifying, exporting, and performing other processes on data (e.g., files, database records, data streams, etc.) representing two- and/or three-dimensional designs of objects that can be fabricated by AM processes. The program instructions and other data for performing the processes herein may cooperate with the CAD program.

The processor 102 receives, as input, an initial object design 110. The initial object design 110 may be input by a user of an interface 108, which may be presented to a user on the computing device 100 or on another device, such as a drafting computer. The interface 108 may be presented on a display of the user device via a dedicated software application (e.g., a CAD program), an internet browser or other web application, or another suitable application in which the interface 108 is a component, such as in a web dashboard or other administration tool. In some embodiments, the interface 108 may be configured to prompt the user to provide the initial object design 110, and may present and facilitate one or more options for doing so. For example, the interface 108 may prompt the user to select a file for upload. The interface 108 may further prompt the user to enter other data used in the present processes, such as the control parameter η for determining a support volume constraint, as described below.

The processor 102 executes the device logic 104 to apply an iterative optimization process 120 to transform the initial object design 110 into an optimized design 130. The optimized design 130 is topologically optimized for performance, i.e., an object manufactured by AM processes from the optimized design 130 performs substantially the same functions as an object manufactured from the initial object design 110. The optimization is further constrained to minimize the total volume of support structures (e.g., support structures 132) needed during fabrication of the corresponding object by AM processes. The processor 102 may store the optimized design 130 (and any intermediate designs), such as in memory 106, and/or may export the optimized design 130 to another system, such as an AM device.

Consider a typical compliance minimization problem of the form:

$$\underset{\Omega \subset \Omega_0}{\text{Minimize}} J$$

$$|\Omega| \le V_f |\Omega_0|$$

$$Kd = f$$

In the above equation, $J = f^T d$ is the compliance that must be minimized, $|\Omega_0|$ is the initial design volume, $\Omega$ is the topology to be computed, and $V_f$ is the desired volume fraction; K is the stiffness matrix, f is the external force vector, and d is the displacement vector.

There are several TO methods employed today to solve such TO problems; these include Solid Isotropic Material with Penalization (SIMP), level-set, and evolutionary methods. While the below-described methods and improvements may be adapted for any such TO methods, and others, we propose to use the level-set based Pareto Topology Optimization (PareTO) method for the following reasons: (1) in level-set methods, the boundary is well-defined at all times, making it easier to impose support structure constraints, and (2) PareTO relies on the topological sensitivity concept that applies to various performance criteria and constraints, and further can be generalized to handle the "support structure topological sensitivity" constraints introduced in this disclosure.

Figure 2:
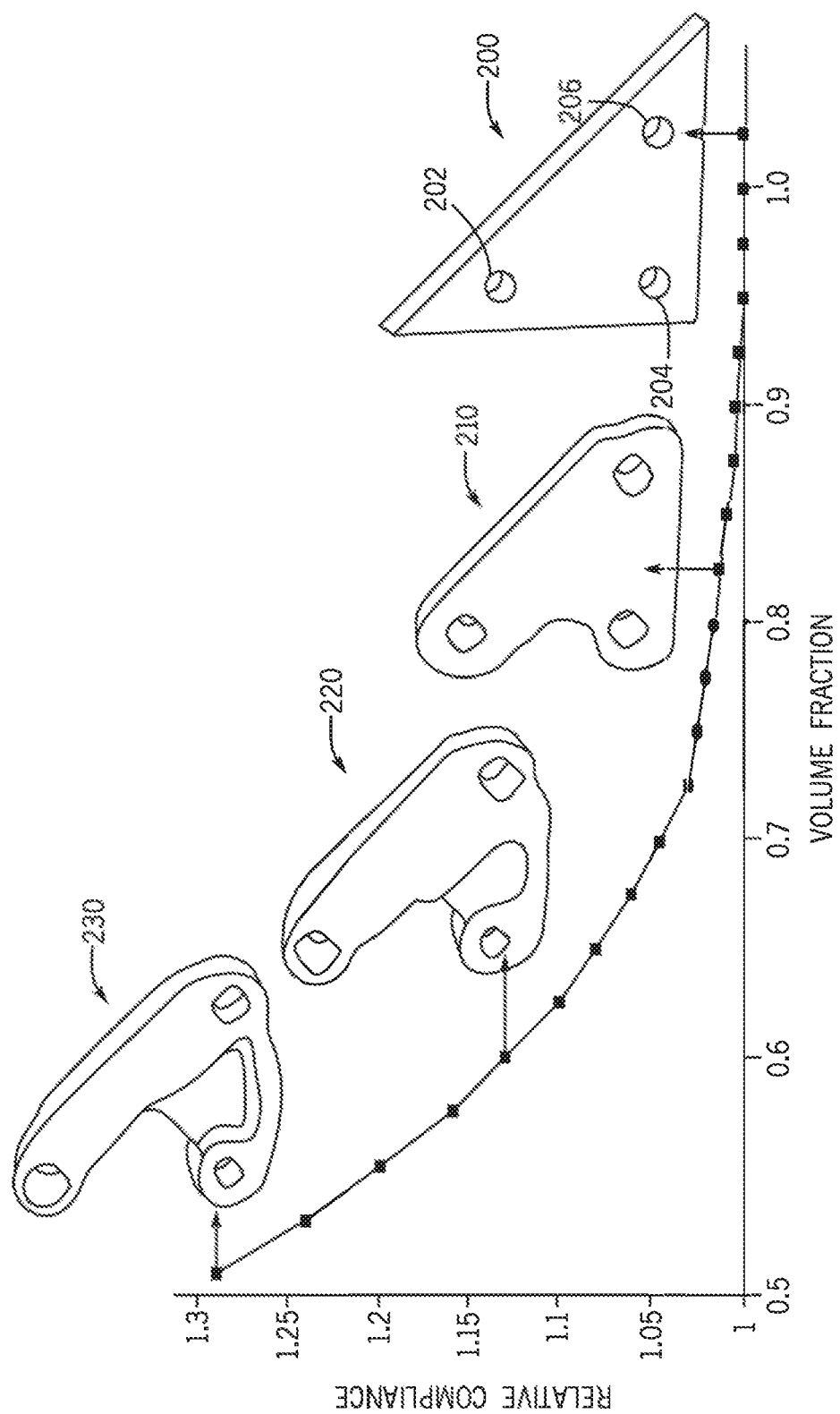
FIG. 2 is a graphic diagram of a topographical optimization of a triangular bracket, the graph showing the relative compliance change over multiple volume-reducing iterations.

An important feature of the PareTO method is that it generates Pareto-optimal topologies for various volume fractions. FIG. 2 illustrates a PareTO optimization of an exemplary triangular three-hole bracket 200, where the two left side holes 202, 204 are fixed and the right side hole 206 is subject to a downward unit load. The underlying material is assumed to be isotropic ABS plastic with Young's modulus of E=2 GPa and Poisson ratio of v=0.39. The progression of the optimization process in PareTO reduces the amount of material needed, from a beginning volume of 1.0 to a volume fraction of 0.5. The optimization generates multiple topologies that lie on the Pareto curve (Pareto tracing); illustrated are the eighth iteration topology 210, the 17th iteration topology 220, and the 21st iteration topology 230. The generation of multiple topologies plays an important role in the proposed method for constraining the support structure volume.

A review of how support structures are algorithmically generated to understand the development of appropriate constraints. Support structure generation in AM is based on the "overhang concept," which states that if the angle between the boundary normal and the build direction exceeds a certain threshold, then support structures are needed at that point. Referring to FIG. 3A, for the design 300 and the build direction indicated by the arrow B, the angle α between the build direction and the normal N of the unsupported boundary 302 is subtended. Boundary points with the angle α greater than a threshold, such as 135 degrees, are considered overhanging and require support. For simplicity, vertical support structures (e.g. 310, 312) are assumed, but non-vertical support structures may also be used. Support structures may terminate at a support platform 330 or at any opposing non-overhanging point on a boundary of the design 300. The union of all such support structures results in a support volume, which is the sum of the shaded areas 320A-D. The fill-ratio, i.e., material density, of support structures is typically less than that of the primary design.

The above definition is exploited both by designers and software algorithms to create suitable support structures. Further, the definition suggests that if one could eliminate all overhanging surfaces, then support structures can also be eliminated. But, this is not an effective optimization strategy for several reasons. First, eliminating all overhanging surfaces may not be possible. Researchers have demonstrated that one can eliminate overhang surfaces in certain 2D problems. However this is unlikely to be successful in general, especially in 3D. Second, the overhang constraint does not penalize support volume. Two overhanging surfaces with equal subtended angle will be penalized equally, although the support volume associated with one may be much larger than the other. To avoid such contradictions, a direct constraint on the support volume is desirable.

Third, penalizing just the overhanging surfaces is insufficient. Support volume may be enclosed between an overhanging surface and an opposing surface, as illustrated by support volume 320D of FIG. 3A. To reduce support volume, both surfaces must be penalized, such as by moving them closer to each other. By penalizing the overhanging surface, only half the problem is addressed. These limitations, among others, suggest the need for an alternate, and fundamentally different, method to impose constraints on support structures during TO. The formulation proposed herein relies on (1) dynamically estimating the support volume as the topology evolves, and (2) imposing constraints on the support volume through topological sensitivity methods.

To dynamically estimate the support volume, assuming that support structures are vertical, a simple integral of the support length over the boundary may be multiplied by a suitable fill ratio:

$$S = \gamma \int_{\alpha \ge \hat{\alpha}} l_p d\Gamma$$

S: Support structure volume
α: Subtended angle
$l_p$: Length of support structure at boundary point p
γ: Fill ratio (relative material density) of support structures In the above equation, the exact value of the fill ratio is not critical; it can be assumed to be 0.5, without a loss in generality.

Figure 3B:
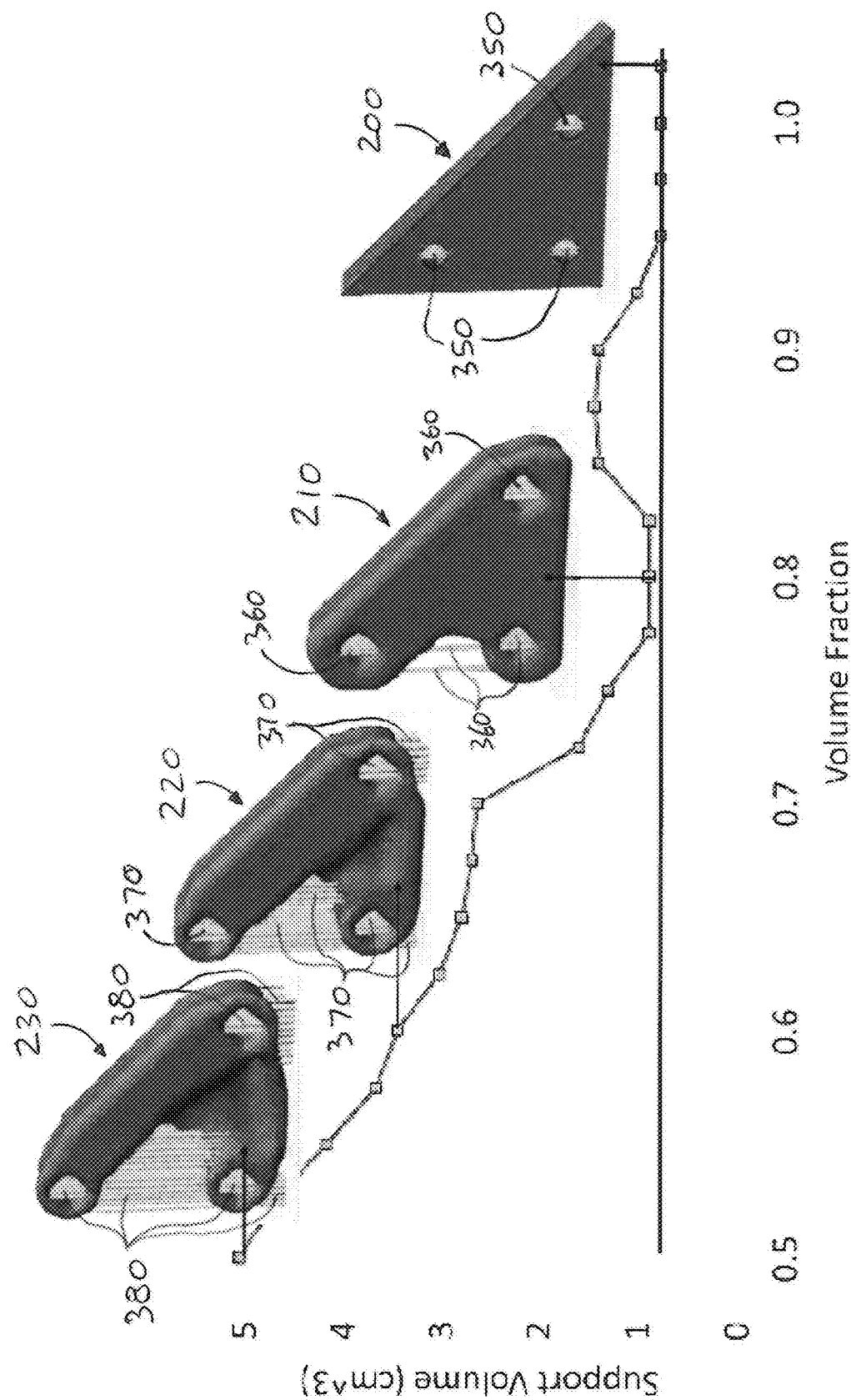
FIG. 3B is a graphic diagram of the topographical optimization of FIG. 2 further showing expected support volumes for each illustrated iteration, the graph showing the support volume change over multiple volume-reducing iterations.

Next, a support volume constraint may be imposed. For comparative purposes, FIG. 3B illustrates the same PareTO optimization of the triangular bracket 200 as in FIG. 2, which has no constraints on the support volume (referred to herein as an "unconstrained topological optimization"). The necessary support structures 350, 360, 370, 380 are depicted. Each iteration of the optimized bracket has a support volume $S_{unc.}(v)$ at its respective intermediate fraction v. The support volume curve is, in general, non-smooth, unlike the compliance curve in FIG. 2.

In some embodiments, the present TO framework may impose an absolute support volume constraint $S \leq S_{max}$, where S is the total support volume of the optimized design and $S_{max}$ is an upper limit of the total support volume, selected by the designer. In most optimization problems, however, the absolute constraint will not produce a design with the optimal support volume, and it places an unreasonable burden on the designer to arrive at an absolute value for the upper limit a priori. Alternatively, or additionally, relative upper bound constraints may be imposed, using the PareTO method of generating multiple topologies for various volume fractions to store reference support volumes S(v). The reference support volumes may be generated according to a relative support volume constraint, $S(v) \leq \eta S_{unc.}(v)$, where η is a user-defined control parameter and (0<η≤1). That is, the desired support volume should be less than the unconstrained support volume by a factor of η.

The relative support volume constraint may be a 'soft' constraint, i.e., the constraint is used to prioritize the solutions within the feasible space, rather than limiting this space. The parameter (0<η≤1) may be used to strike a balance between performance and AM costs. Combining the above equations provides an intermediate support-structure constrained TO problem:

$$\underset{\Omega \subset \Omega_0}{\text{Minimize}} J$$

$$|\Omega| \leq V_f |\Omega_0|$$

$$S(v) \leq \eta S_{unc}(v) \text{(soft)}$$

$$Kd = f$$

Figure 4A:
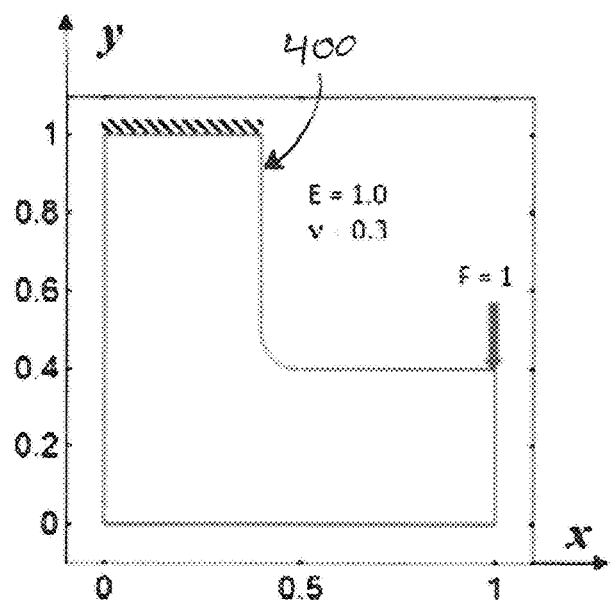
FIG. 4A is a diagram of an initial design for an L-shaped bracket.
Figure 4B:
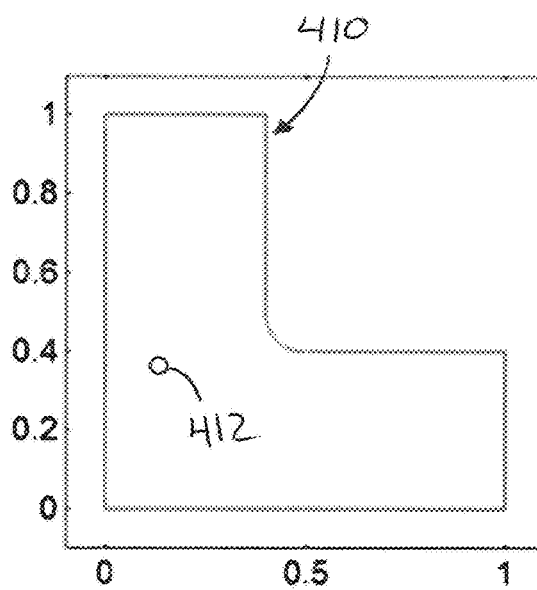
FIG. 4B is a diagram of an initial design for the L-shaped bracket of FIG. 4A with a hypothetical hole added to the interior.

A gradient based TO framework may then be used for solving the above problem. The framework will rely on both (1) topological sensitivity for performance, and (2) the proposed topological sensitivity for support structure volume. With respect to (1), the PareTO method relies on the concept of topological sensitivity for driving the optimization process. To illustrate, FIG. 4A presents a first object design 400 that represents a structural topology in the design space $\Omega_0$ described above, and FIG. 4B presents a second object design 410 that is the first object design 400 modified to include a small hypothetical hole 412 in the topology.

Topological sensitivity is the rate of performance change of any quantity of interest φ with respect to the volumetric measure of the hole, i.e., in 2D:

$$\mathcal{T}_\varphi(p) \equiv \lim_{\varepsilon \to 0} \frac{\varphi(p; \varepsilon) - \varphi}{\pi \varepsilon^2}$$

If the performance metric is compliance, the field in 2-D is given by the closed-form expression:

$$\mathcal{T}_J(p) = \frac{4}{1+v}\sigma : \varepsilon - \frac{1-3v}{1-v^2}tr(\sigma)tr(\varepsilon).$$

Figure 4C:
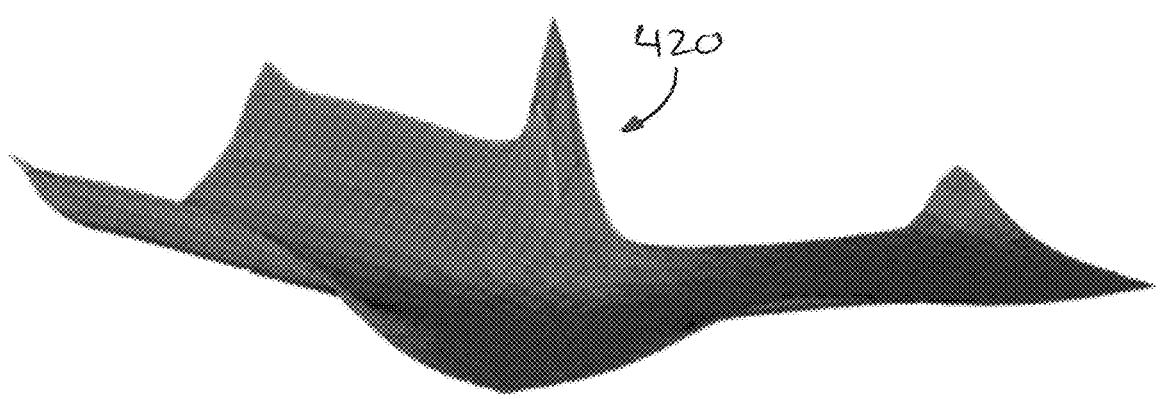
FIG. 4C is a computer-simulated diagram of a topological sensitivity field for the object design of FIG. 4B.

Thus the topological sensitivity can be computed as follows: (1) finite element analysis (FEA) is carried over the domain, (2) stresses and strains are computed, and (3) then the topological sensitivity field is computed. FIG. 4C illustrates the resulting field 420 of topological sensitivity. The interpretation is that regions of low sensitivity correspond to regions with relatively lower impact on performance (and can be removed). Similar topological sensitivity fields can be computed for various performance metrics, both in 2D and 3D.

Figure 5A:
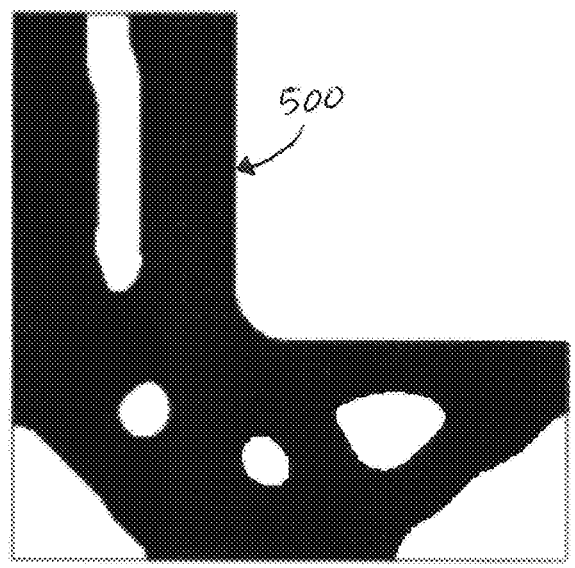
FIG. 5A is a diagram of an exemplary optimized topology of the design of FIG. 4A.
Figure 5B:
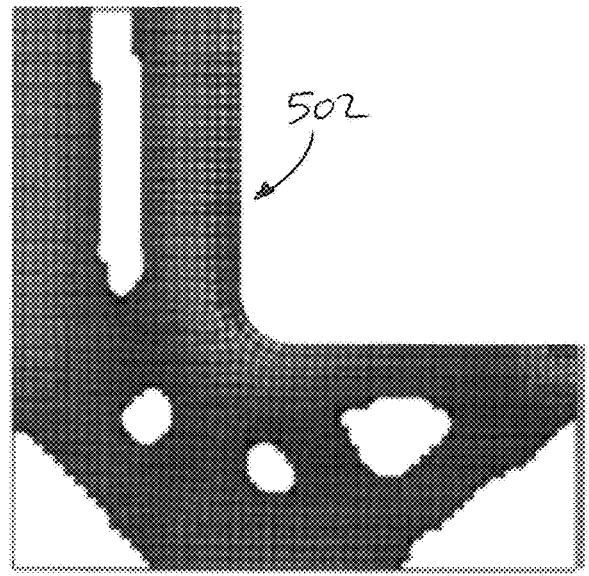
FIGS. 5B and 5C are computer-simulated diagrams of a topological sensitivity field having no support volume constraints.
Figure 5C:
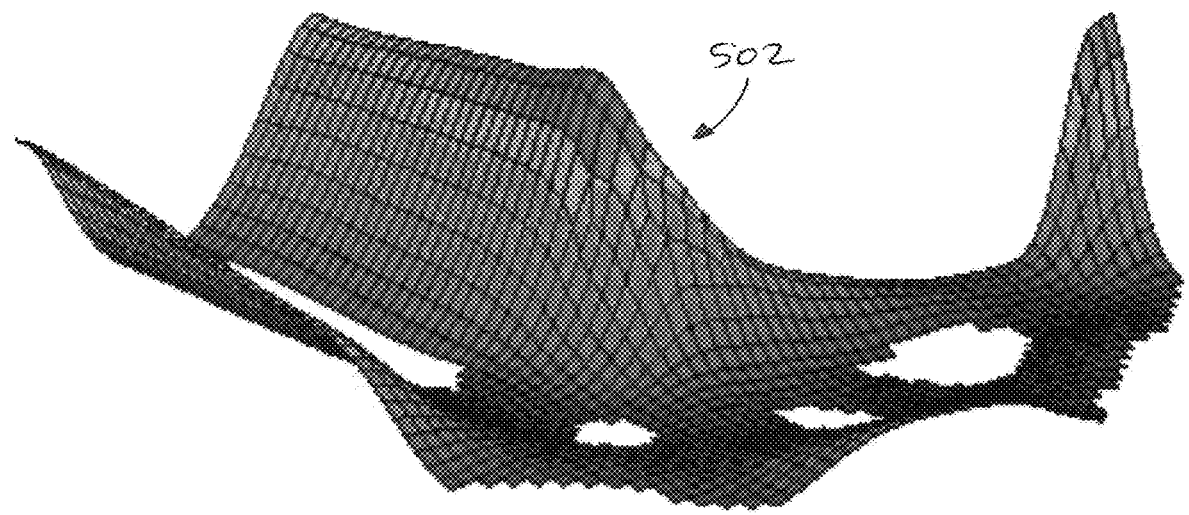

The PareTO method uses the topological sensitivity as a level-set to trace the Pareto curve for a decreasing-volume fraction. As the topology evolves, the topological sensitivity is recomputed at each iteration. Referring to FIG. 5A, for an intermediate topology 500 (of the first design 400 of FIG. 4A), (1) FEA is carried over the topology 500, (2) the stresses and strains are computed, and (3) the topological sensitivity field is computed through the above equation; the resulting topological sensitivity field 502 is illustrated in FIGS. 5B and 5C.

The present methods modify the known PareTO methods to further have sensitivity for support volumes. An effective sensitivity field for support structure may take into consideration two metrics: (1) surface angle, and (2) overhang horizontal distance. Since these considerations may differ from one AM technology to the other, and comprehensive standards are yet to be devised, the present methods evaluate these criteria separately: first, a topological sensitivity is formulated based only on surface angle; then, this sensitivity formulation is modified to consider overhang horizontal distances.

Figure 6A:
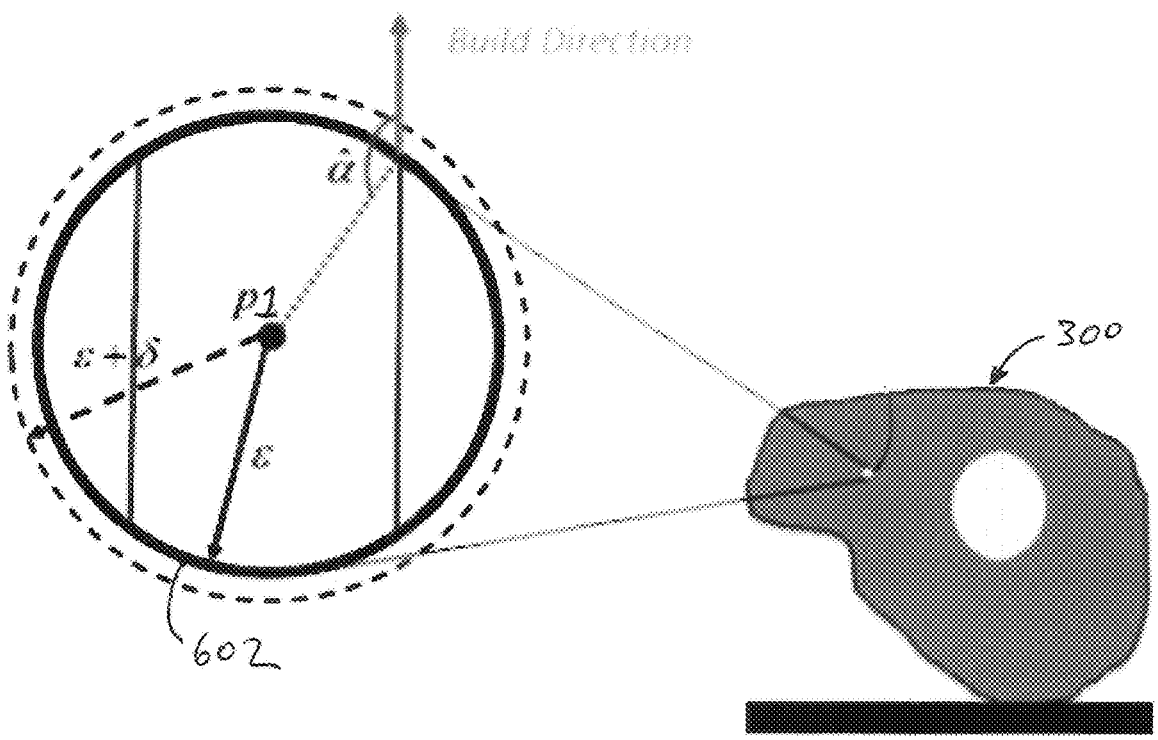
FIGS. 6A and 6B are diagrams illustrating different points of perturbation of the topology of FIG. 3A.

In the same vein as the topological sensitivity for performance with respect to the topological change of FIGS. 4A-5C, topological sensitivity for support structure volume may be evaluated as the rate of change in support structure volume with respect to volume metric measure of the hole. FIG. 6A illustrates a scenario where the exemplary design 300 of FIG. 3A is infinitesimally perturbed at a point $P_1$ in the interior of the topology. If a hole 602 of radius ε is inserted in the interior of the domain ($\Omega_g$), the topological-shape sensitivity may be computed as follows. First, the topological derivative is computed via:

$$T_S(p \in \Omega) \equiv \lim_{\substack{\varepsilon \to 0 \\ \delta \to 0}} \frac{S(\Omega_{\varepsilon+\delta}) - S(\Omega_\varepsilon)}{V(B_{\varepsilon+\delta}) - V(B_\varepsilon)}$$

In the above equation, $S(\Omega_g)$ and $V(B_g)$ are support volume and hole volume, for a hole of radius ε. Using the above definition, the support volume sensitivity is given by:

$$\mathcal{T}_S(p \in \Omega) = \frac{3(\pi - \hat{\alpha} - \sin(\hat{\alpha})\cos(\hat{\alpha}))\left(\sin(\hat{\alpha}) - \frac{\sin^3(\hat{\alpha})}{3}\right)}{\pi}$$

Where $\pi/2 \leq \hat{\alpha} \leq \pi$ is the threshold angle. For example, if the threshold angle $\hat{\alpha} = \pi/2$, then $T_s(p)=1$, i.e., the entire hole will need to be filled with support structures; a typical value is about 0.72, or 72% filled with support structures, when $\hat{\alpha}=3\pi/4$.

Figure 6B:
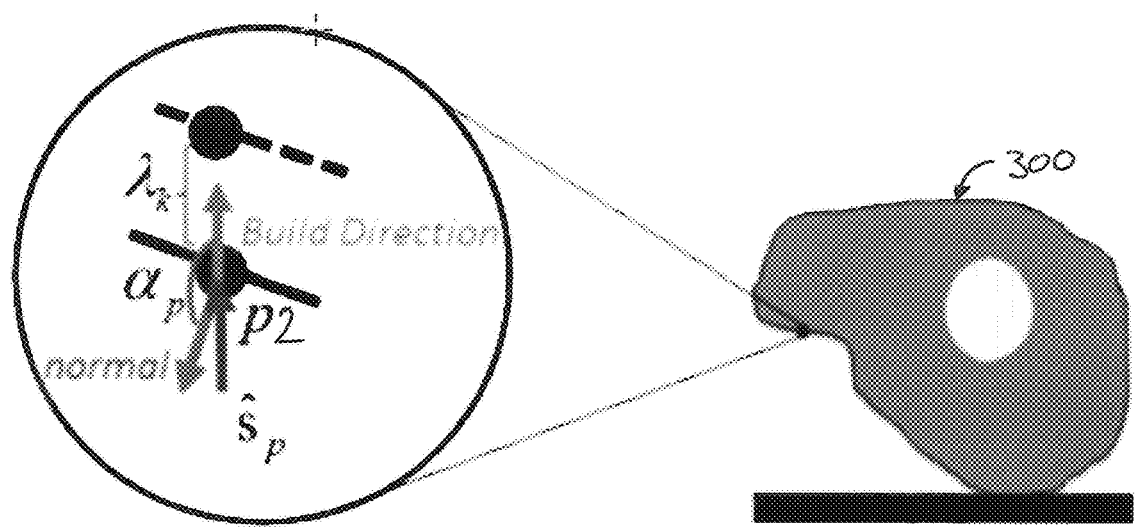

FIG. 6B illustrates a scenario where the exemplary design 300 of FIG. 3A is infinitesimally perturbed at a point P2 on the boundary of the topology. Unlike the interior, the support volume on the boundary depends both on the local neighborhood (curvature) and the length and direction of support. In order to capture both, we define a scalar function $F^S(x_p)$ at each boundary point as follows:

$$F^S(x_p) = \frac{1}{2}l_p(1 - \cos(\alpha_p))$$

In the above equation, $\alpha_p$ is the angle between surface normal and build direction at boundary point p. The sensitivity is computed for the worst-case scenario, where the boundary is perturbed along a support at each point $\hat{s}_p$. The sensitivity at the boundary is given by:

$$\mathcal{T}_S(p \in \partial\Omega) = \frac{1}{2}(1 - \cos(\alpha_p))$$

Figure 7A:
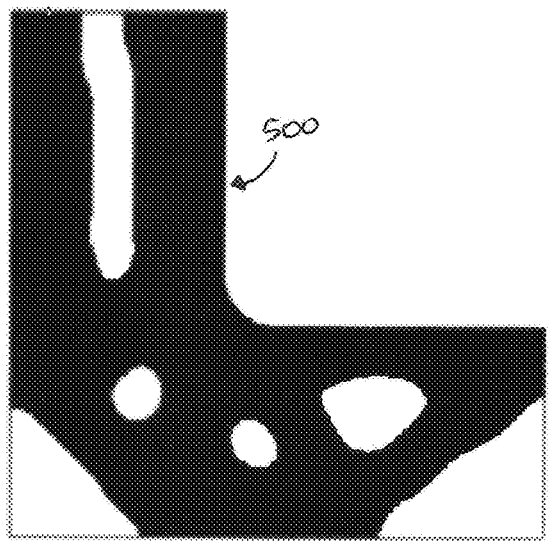
FIG. 7A is a diagram of an exemplary optimized topology of the design of FIG. 4A.
Figure 7B:
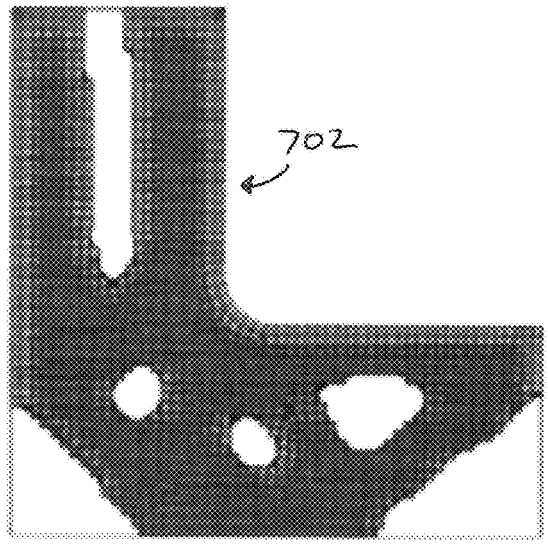
FIGS. 7B and 7C are computer-simulated diagrams of a support volume topological sensitivity field.
Figure 7C:
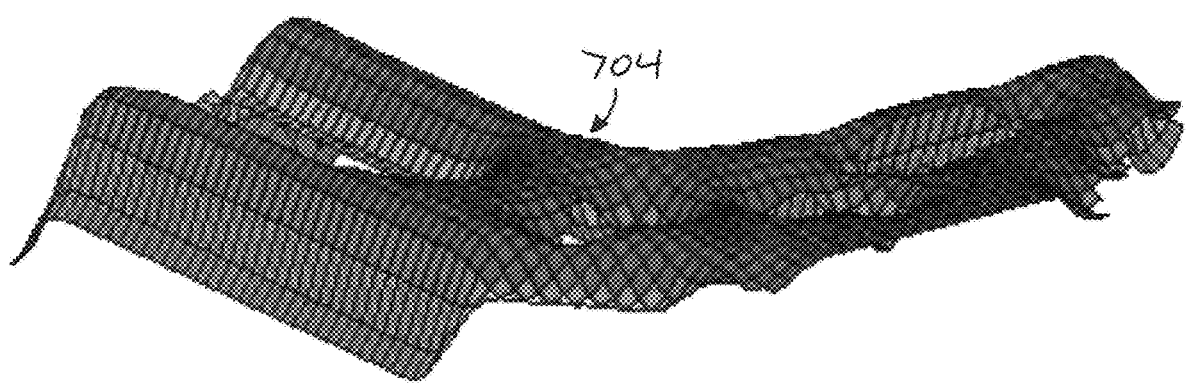

Further, for each overhang point, the same sensitivity value is assigned to its corresponding opposite point. Referring to FIGS. 7A-C, the above definitions give the support volume sensitivity at all points, illustrated by the sensitivity field 702 produced from the exemplary topology 500.

The effect of the horizontal overhang distance r may be incorporated into the definitions for support volume sensitivity. As the overhang distance depends on the AM technology and material properties, the value of this distance can be subject to change and may be defined by the designer. Exemplary reasonable values of r for fused deposition modeling (FDM) may be based on ranges of the subtended angle α>135 degrees: r=20 mm for angles up to 150 degrees; r=15 mm for angles over 150 and up to 155 degrees; and r=5 mm for angles over 155 degrees and up to 180 degrees (i.e., parallel to the support surface). In the sensitivity formulation, the selection of r may be treated as a kernel smoothing operation that is build-direction dependent: at each overhang point, take the minimum subtended angle between all the neighboring boundary points that are closer than r and are underneath (or at least at the same layer) of the overhang point. In this sense, the horizontal overhang distance is a type of kernel smoothing operation which is directional and assigns minimum value around a vicinity to its center.

Once the performance and support volume sensitivities are computed and normalized, the present methods may impose the support structure constraint. The original support-constrained TO problem above may be expressed in the standard form:

Minimize $J$
$\Omega \subset \Omega_0$ $|\Omega| \leq V_f|\Omega_0|$ $g = \dfrac{S^e}{S^v_{unc}} - 1 \leq 0$ (soft)

$Kd = f$

A popular method for solving such constrained optimization method is the augmented Lagrangian method, where the constraint and objective are combined to a single field, leading to an augmented topological field:

$$\mathcal{T} = (1-\omega_S)\mathcal{T}_J + \omega_S \mathcal{T}_S$$

where the weight is defined via the augmented Lagrangian formulation:

$$\omega_0 = \begin{cases} \min(1, (\mu - \gamma g)) & \mu - \gamma g \leq 0 \\ 0 & \mu - \gamma g > 0 \end{cases}.$$

Observe that the weight on the support structure sensitivity is zero if the support volume constraint is satisfied, i.e., g>0, else it takes a positive value. The value μ is the Lagrangian multiplier and is updated via:

$$\mu^{k+1} = \max\{\mu^k - g, 0\}$$

The penalty parameter γ is modified as follows:

$$\gamma^{k+1} = \begin{cases} \gamma^k & \min(g^{k+1}, 0) \leq \zeta\min(g^k, 0) \\ \max(\lambda\gamma^k, k^2) & \min(g^{k+1}, 0) > \zeta\min(g^k, 0) \end{cases}$$

where typically ζ=0.25 and ζ=10.

Figure 8A:
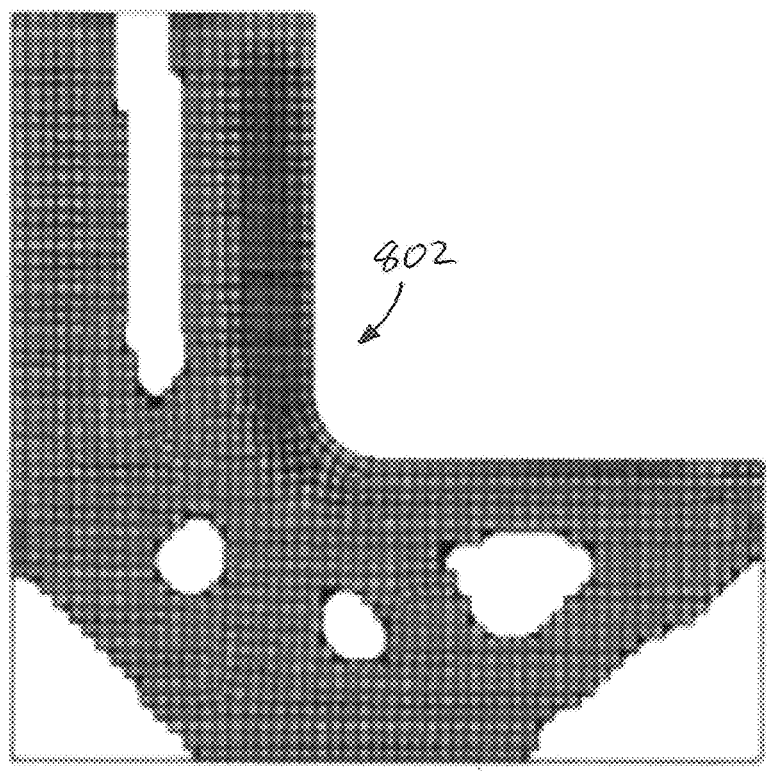
FIGS. 8A and 8B are computer-simulated diagrams of an augmented topological field combining the topological sensitivity fields of FIGS. 5B-C and 7B-C.
Figure 8B:
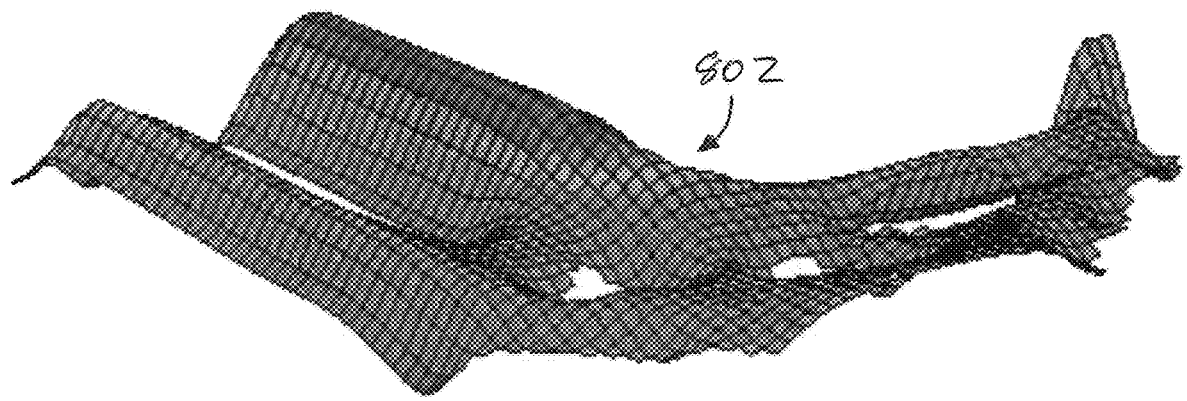

Referring to FIGS. 8A-B, to produce the augmented topological field 802, the two topological sensitivity fields (e.g., fields 502 of FIGS. 5B-C and 702 of FIGS. 7B-C) are normalized to unity at an instance when the weight $w_s$=0.5. The resulting field 802 is a combination of the two fields 502, 702, and the relative weight is automatically determined from the Lagrangian formulation.

Figure 9:
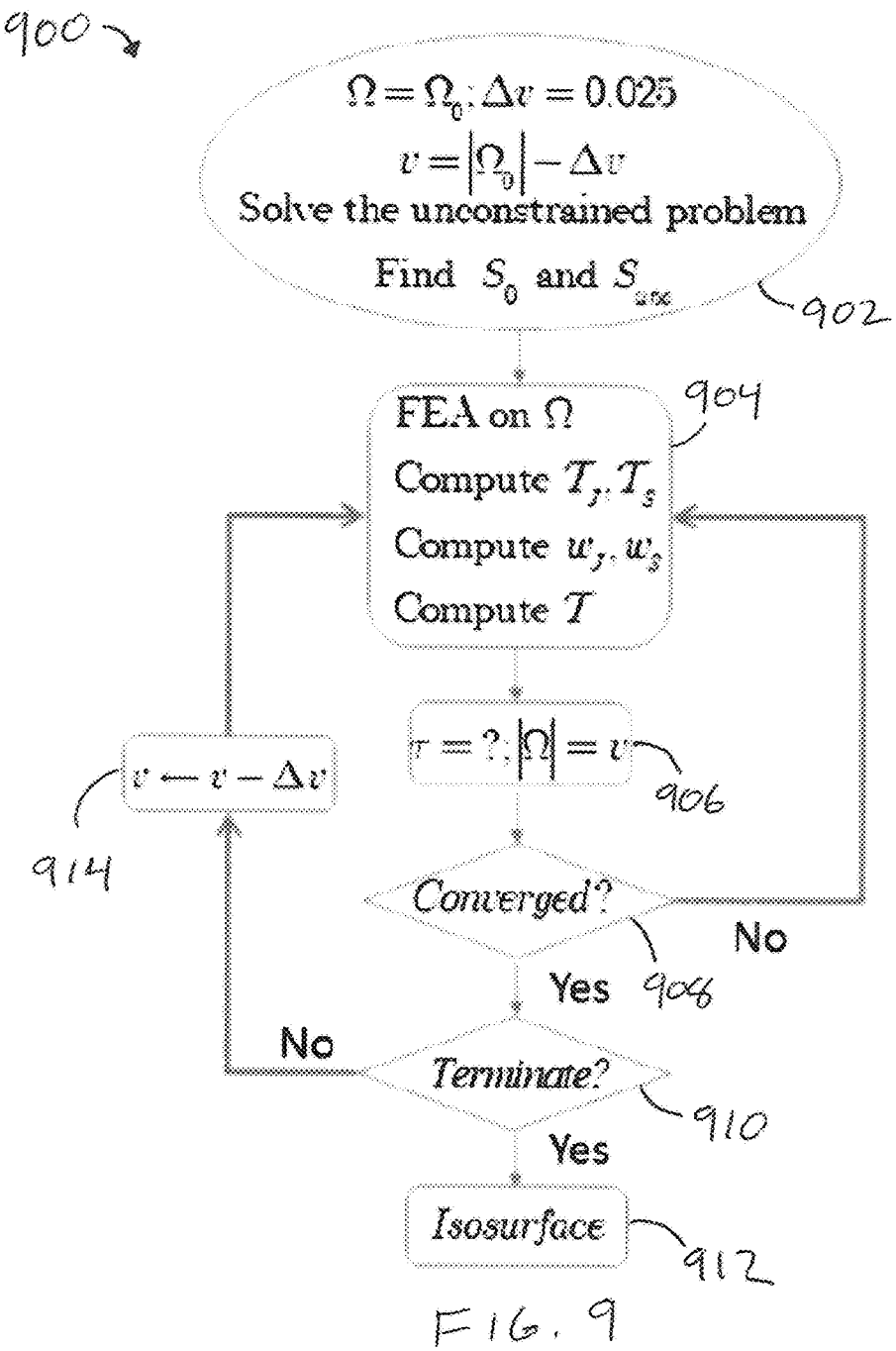
FIG. 9 is a flowchart of a method of optimizing an object using a support volume sensitive topographical optimization framework.

With reference to FIG. 9, piecing these concepts together, the proposed method 900 for using the present TO framework to find an optimized isosurface, and therefore an optimized design, for a topology no of a given initial design proceeds as follows. At step 902, a system executing the method 900 may solve the unconstrained optimization problem described above to obtain both the initial support volume $S_0$ of the initial object design, and the unconstrained support volume $S_{unc}$ of the first unconstrained optimization of the initial design. In some embodiments of the present method 900, it may be assumed that the unconstrained optimization problem has been solved, and the two parameters $S_0$ and $S_{unc}$ have been computed and received by the system executing the method 900.

At step 904, the system may compute the augmented (i.e., weighted) topological field T. As described above, one embodiment of computing the augmented topological field T includes: carrying out FEA on the topology Ω; computing each of the normalized sensitivity fields $T_j$, $T_s$; computing the weighted field T from $T_j$ and $T_s$; and smoothing the field T. In some embodiments, every time the topology Ω changes, FEA must be executed and the topological sensitivities recomputed.

At step 906, treating T as a level-set function, the system may extract a new topology Ω using fixed-point iteration. At step 908, the system may compare the new topology to the previous topology to determine whether the topology has converged. If the topology has not converged, the system returns to step 904 to repeat the computations on the new topology. If the topology has converged, at step 910 the system may determine whether a desired volume for the isosurface has been reached. If so, at step 912 the system may output a final optimized isosurface corresponding to the last-extracted, converged topology. If the desired volume has not been reached, at step 914 the system may decrement the volume fraction and return to step 904.

Numerical Examples

Several examples are now described to demonstrate the proposed TO framework and optimization methods. In all of the examples, the material is assumed to be isotropic ABS plastic with Young's modulus of E=2 GPa and Poisson ratio of ν=0.39. The interior support sensitivity is included in all of the examples to achieve a smoother sensitivity field.

FIG. 10A illustrates an exemplary 2D Messerschmidt-Bölkow-Blohm (MBB) beam 1000, an object common to TO examples. The threshold angle is assumed to be $3\pi/4$. The initial design requires no support and the objective is to find the stiffest design at 0.65 volume fraction. FIG. 10B illustrates an unconstrained optimization 1010 performed without support volume constraints; the optimization 1010 presents a relative compliance of 1.29 (i.e., 129% of the initial MBB beam 1000), and its support volume is the baseline support volume against which the optimizations created by the present methods are compared.

FIGS. 10C-E illustrate optimizations produced using the present support volume sensitive TO framework, with different support volume constraints applied. As expected, by reducing the desired support volume, the design is altered to reduce support volume accordingly. Unexpectedly, the alterations also result in increased compliance. In FIG. 10C, a first constrained optimization 1020 is produced with a support volume constraint of 80% (i.e., η=0.8). The first constrained optimization 1020 requires 62% of the baseline support volume, and exhibits a relative compliance of 1.34. In FIG. 10D, a second constrained optimization 1030 is produced with a support volume constraint of 60% (i.e., η=0.6). The second constrained optimization 1030 requires 59% of the baseline support volume, and exhibits a relative compliance of 1.42. In FIG. 10E, a third constrained optimization 1040 is produced with a support volume constraint of 40% (i.e., η=0.4). The third constrained optimization 1040 requires 42% of the baseline support volume, and exhibits a relative compliance of 1.56.

The triangular three-hole bracket 100 discussed above with respect to FIGS. 2 and 3B provides a suitable three-dimensional example. The threshold angle is assumed to be $3\pi/4$. For the non-optimized bracket 100, the support volume is 0.79 cm$^3$. For the unconstrained optimized solution (i.e., the 21st iteration 130 of FIG. 2), the support volume is about 5 cm$^3$ and the relative compliance is 1.29. The objective is to find the stiffest design at 0.5 volume fraction.

Figure 11:
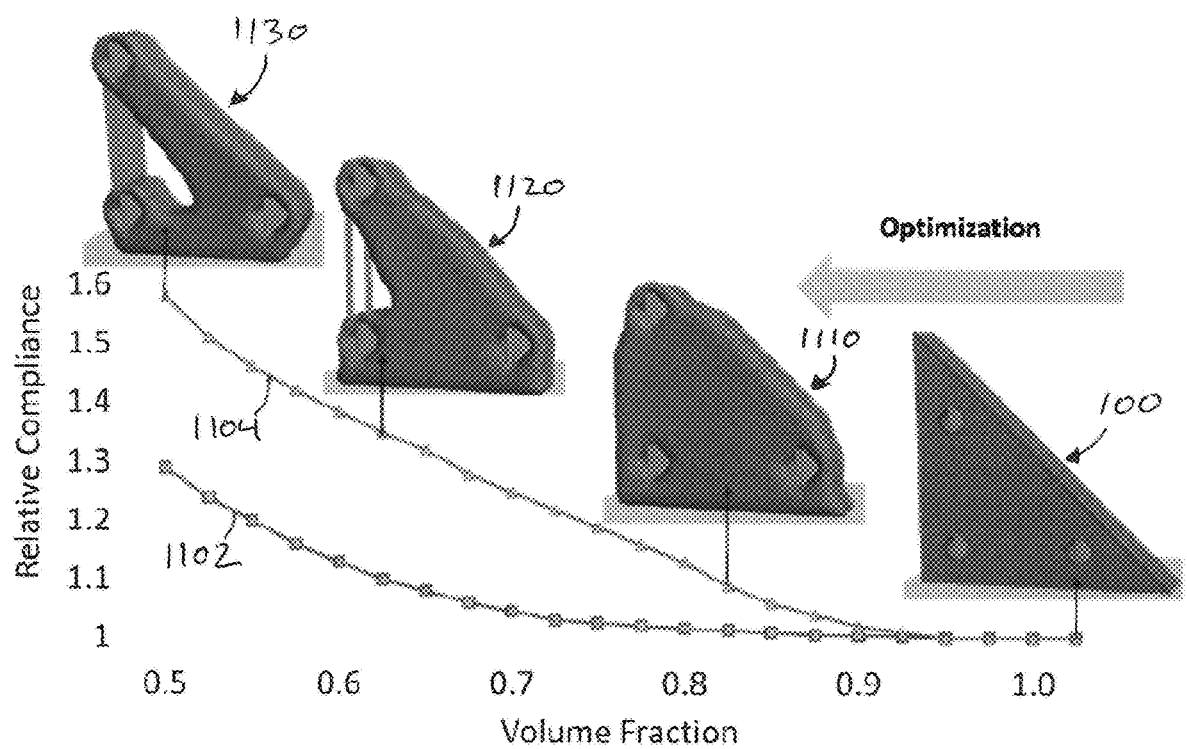
FIG. 11 is a graphic diagram of an iterative, support volume sensitive topographical optimization of the triangular bracket of FIG. 2, the graph showing a comparison of relative compliance over multiple volume-reducing iterations of the support volume sensitive topographical optimization and the unconstrained topographical optimization of FIG. 2.
Figure 12:
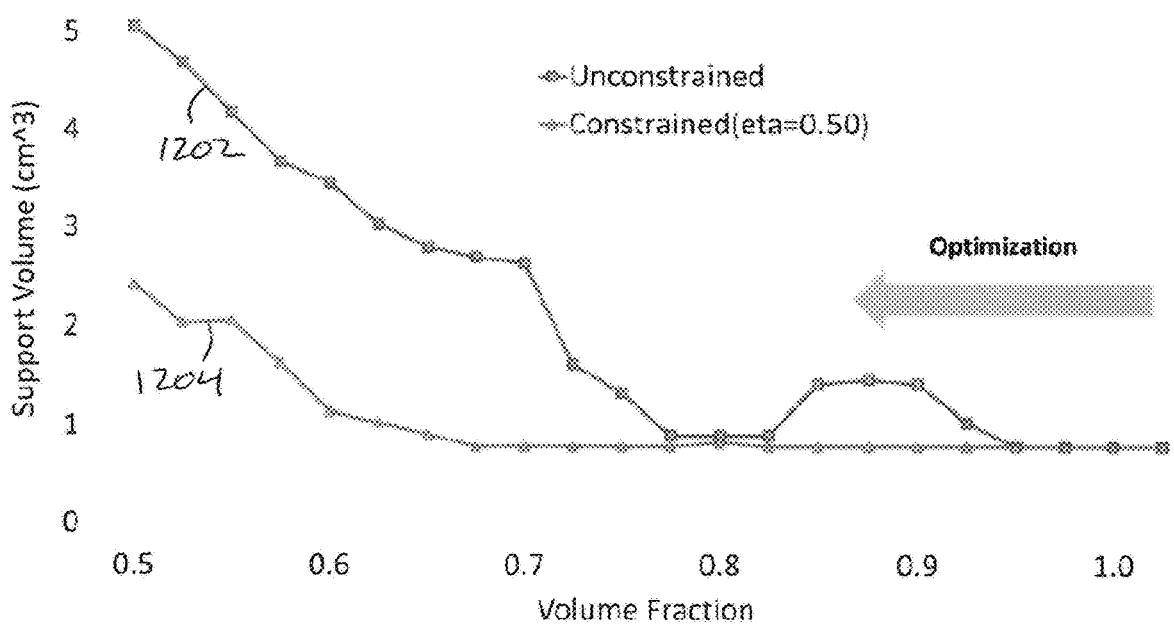
FIG. 12 is a graph of support volume over multiple volume-reducing iterations of the unconstrained topographical optimization of FIG. 2 and the support volume sensitive topographical optimization of FIG. 11.

FIG. 11 shows an unconstrained curve 1102 and a constrained curve 1104 through 21 iterations of volume fraction reduction. FIG. 11 also depicts intermediate solutions at the eight iteration 1110 and 16th iteration 1120, as well as the optimized isosurface 1130 of 0.5 volume fraction, using the present TO framework and methods with a support volume constraint of 50% (i.e., η=0.5). The optimized isosurface 1130 exhibits a relative compliance of about 1.58. Additionally, as shown in FIG. 12 by the unconstrained curve 1202 and the constrained curve 1204, the optimized isosurface requires about 50% of the support volume required by the unconstrained solution. As theorized, removing more material can either increase or decrease the support volume due to its nonlinearity; nonetheless, imposing a stringent constraint on support structure consistently reduces the support volume.

Figure 13:
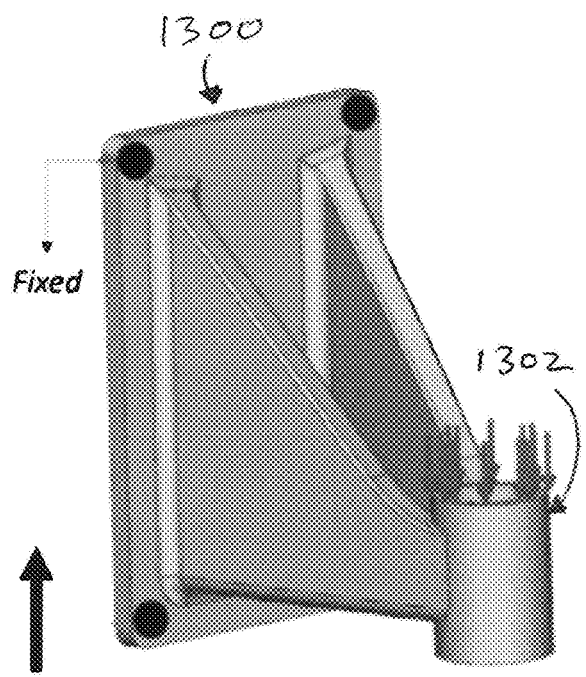
FIG. 13 is a side perspective view of a pole bracket.
Figure 14:
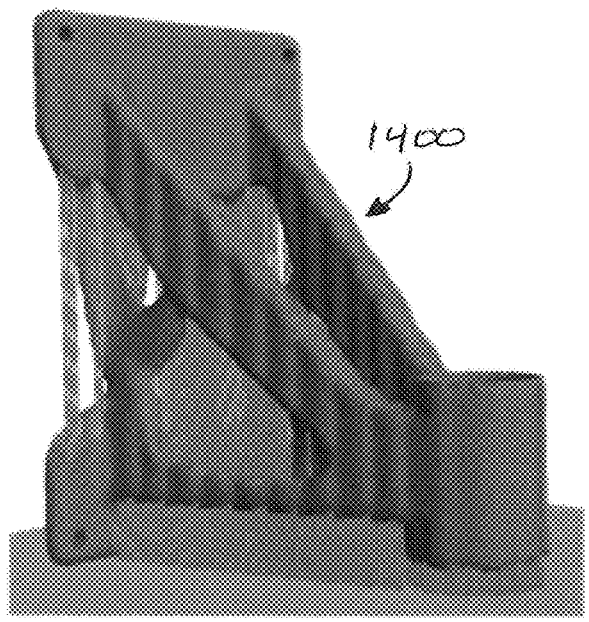
FIG. 14 is a computer-simulated diagram of an unconstrained topographical optimization of the pole bracket of FIG. 13.

Referring to FIG. 13, in another example the present methods optimize a mount bracket 1300. The threshold angle is again assumed to be $3\pi/4$. The build direction is selected to give the best surface quality on the larger cylindrical face 1302. For this design, prior to optimization the support volume is 1.12 cm$^3$. The objective is to find the stiffest design at 0.7 volume fraction. FIG. 14 illustrates the unconstrained optimized design 1400. The final support structure volume for the unconstrained design 1400 is 9.24 cm$^3$.

Figure 15:
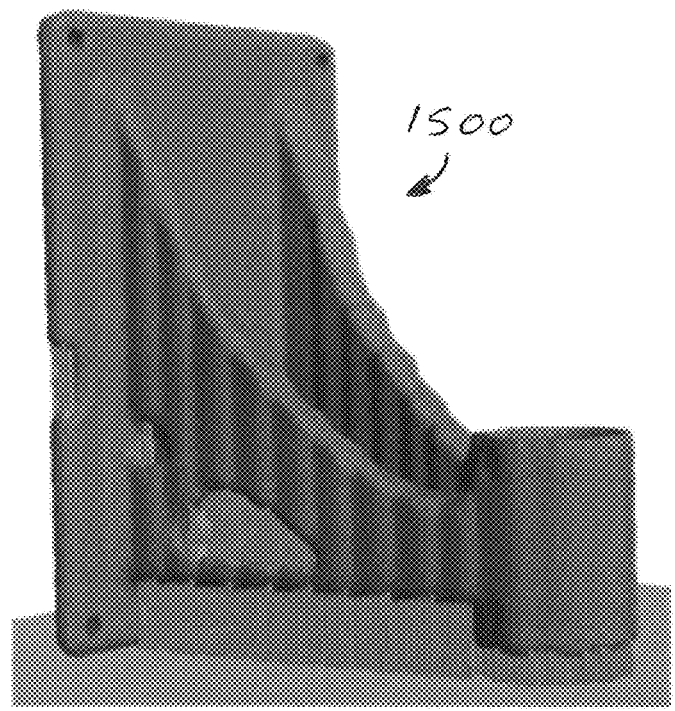
FIG. 15 is a computer-simulated diagram of a support volume sensitive topographical optimization of the pole bracket of FIG. 13.
Figure 16:
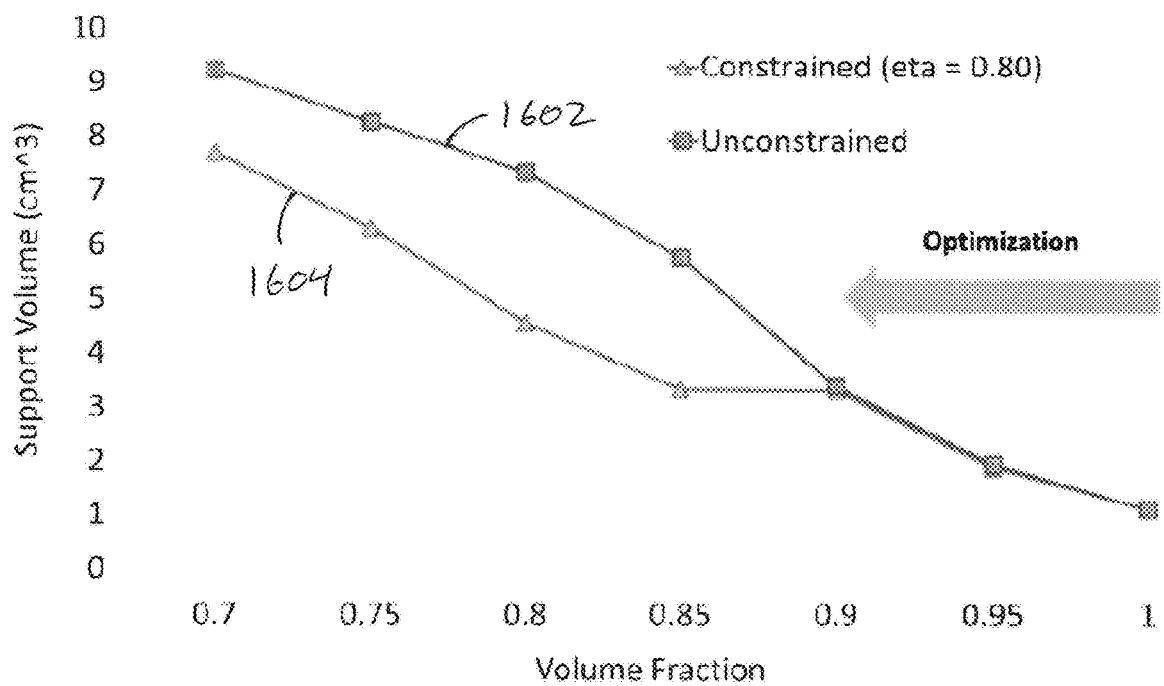
FIG. 16 is a graph of support volume over multiple volume-reducing iterations of the unconstrained topographical optimization of FIG. 14 and the support volume sensitive topographical optimization of FIG. 15.
Figure 17:
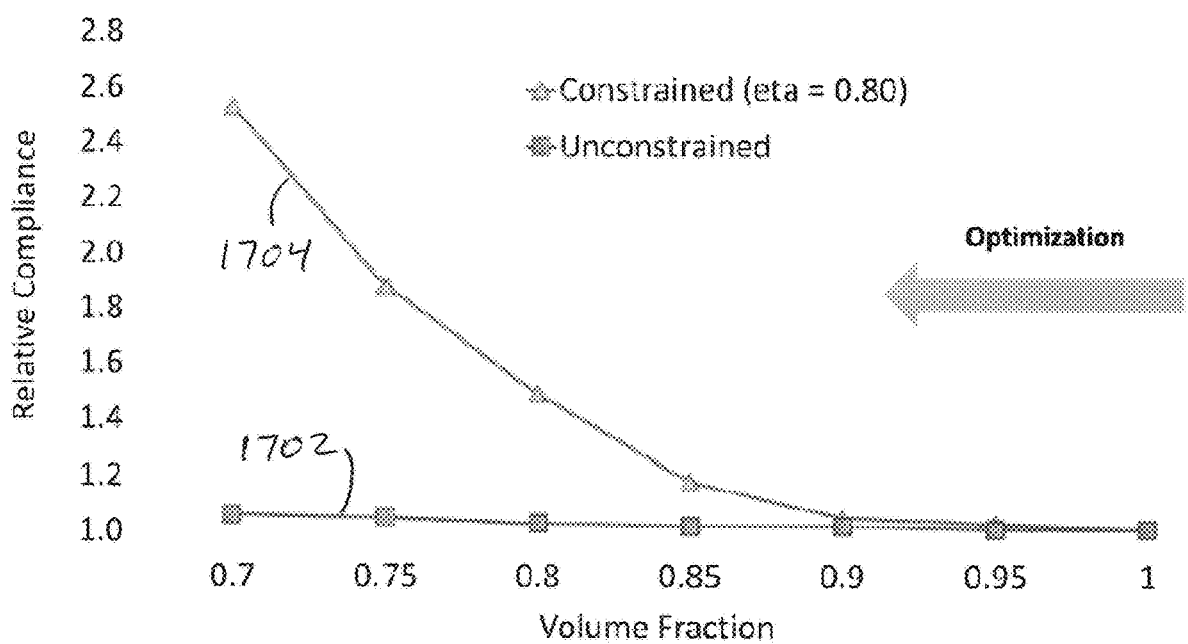
FIG. 17 is a graph of relative compliance over multiple volume-reducing iterations of the unconstrained topographical optimization of FIG. 14 and the support volume sensitive topographical optimization of FIG. 15.

FIG. 15 illustrates the present TO framework optimized design 1500 with a support volume constraint of 80% (i.e., η=0.8). The final support structure volume for the constrained design 1500 is 7.70 cm$^3$, representing an approximately 17% reduction over the unconstrained design 1400 of FIG. 14. FIG. 16 includes an unconstrained optimization curve 1602 and a constrained optimization curve 1604 illustrating the evolution of support volume throughout the optimization process. Up to 0.9 volume fraction the unconstrained and constrained results are very similar. However, for lower volume fractions the constrained support volume is consistently 20% smaller than that of the unconstrained design. FIG. 17 includes an unconstrained optimization curve 1702 and a constrained optimization curve 1704 illustrating the evolution of relative compliance values as more material is removed from the design. For the unconstrained design, the final ($C/C_0$) is about 1.05, while by imposing the support constraint this value increases to about 2.52. This highlights the trade-off between support volume and compliance when the support constraint is imposed. It is essentially up to the designer to choose the intensity of the support constraint.

To verify the validity of these simulated results, each of these topologies was 'printed' on a XYZprinting Da Vinci 2.0 fused deposition printer. Note that the support structures were not generated by the present methods, but introduced by the XYZprinting software, based on default settings. The three optimized designs have the same weight, as prescribed by the optimization, while the amount of support structures is substantially reduced in the constrained design. This example illustrates the effectiveness of the proposed methods in handling support constraints.

Figure 18A:
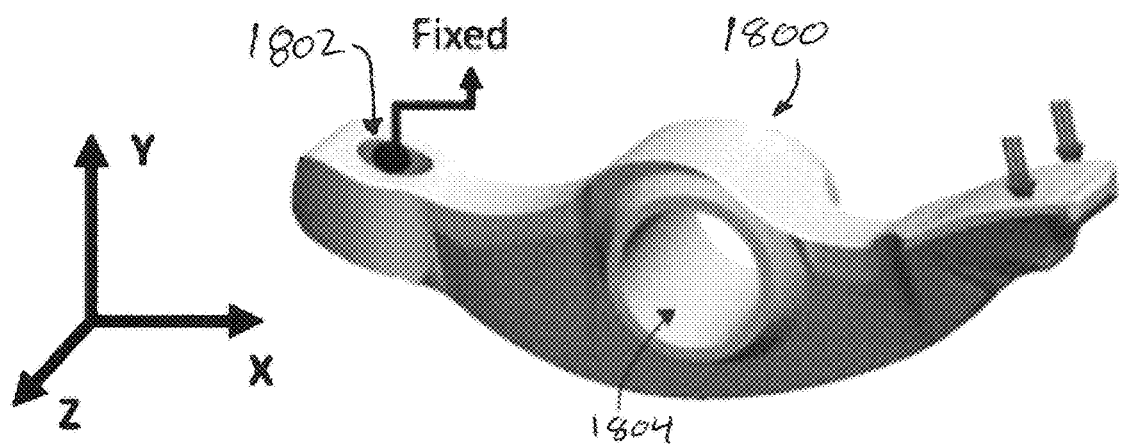
FIG. 18A is a side perspective view of an automotive part.
Figure 18B:
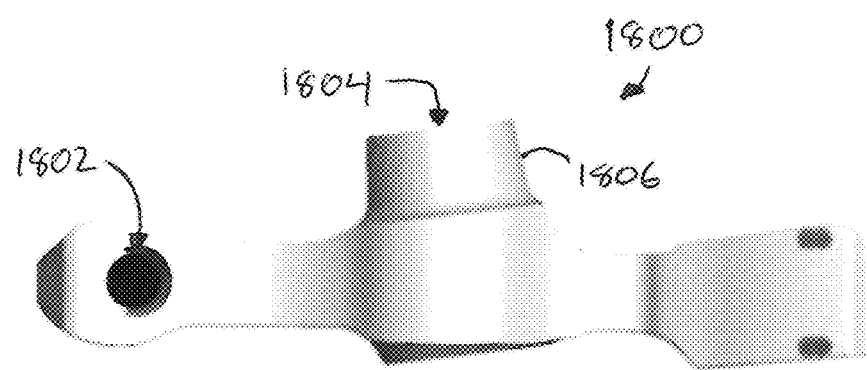
FIG. 18B is a top view of the automotive part of FIG. 18A.
Figure 19:
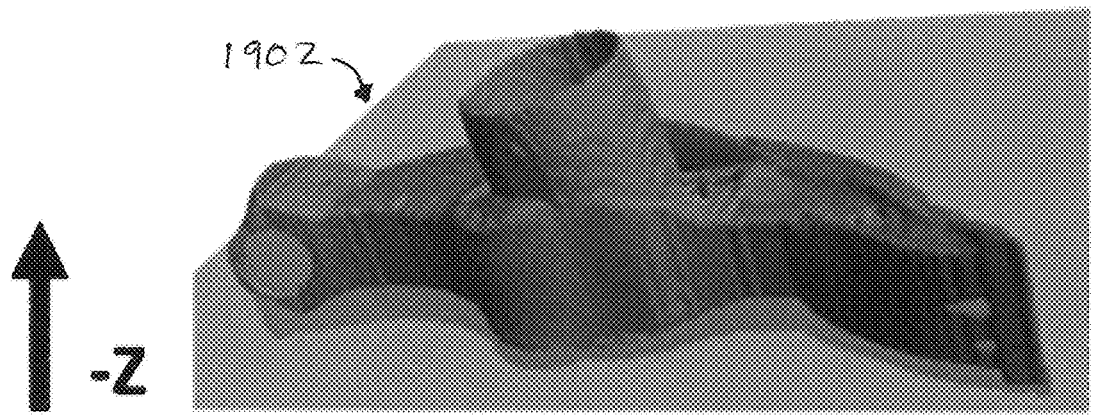
FIG. 19 is a computer-simulated diagram of an unconstrained topographical optimization of the automotive part of FIG. 18A, with an additive manufacturing build direction along the negative Z axis.

The present TO framework and implementation methods are also robust with respect to different build directions of an object. Referring to FIGS. 18A-B, the geometry of an automobile rocker arm 1800 is described via numerous curved surfaces and two cylindrical holes 1802, 1804 in two different directions. This makes selecting the optimal build direction challenging. Further, to capture the complexity of the design, a hexahedral mesh with about 1.7 million degrees of freedom was used. A plausible choice for the build direction is one that provides for the larger cylinder 1806 to have better surface quality, or −Z in this case. Selecting the build direction substantially along the axis of the larger cylinder 1806, as shown in FIG. 19, has the further benefit for the unconstrained optimization 1902 that the initial support is minimal. Thus, the rocker arm design may be optimized for minimum compliance at 0.7 volume fraction without imposing any constraints on support structure.

Figure 20:
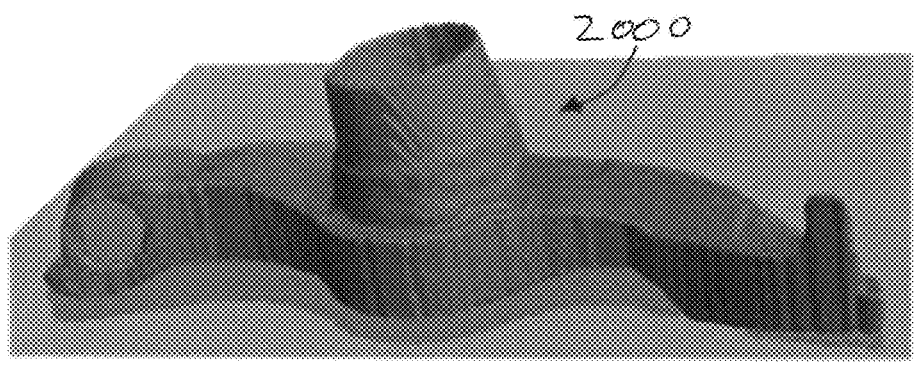
FIG. 20 is a computer-simulated diagram of a support volume sensitive topographical optimization of the automotive part of FIG. 18A, with an additive manufacturing build direction along the negative Z axis.

Next, in order to further reduce support structure, the present optimization may be performed with a support constraint of 90% (i.e., η=0.90), producing the design 2000 in FIG. 20. In imposing the support constraint, no additional overhangs are created; however, since the initial design is dominant, support volume is reduced by only about 3%, while the compliance has increased by about 15%.

Figure 21:
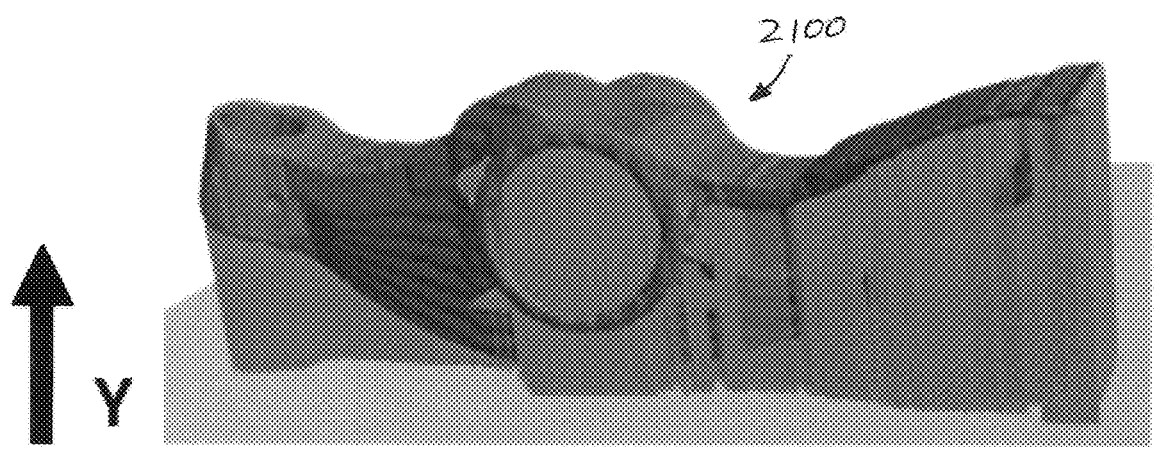
FIG. 21 is a computer-simulated diagram of an unconstrained topographical optimization of the automotive part of FIG. 18A, with an additive manufacturing build direction along the positive Y axis.
Figure 22:
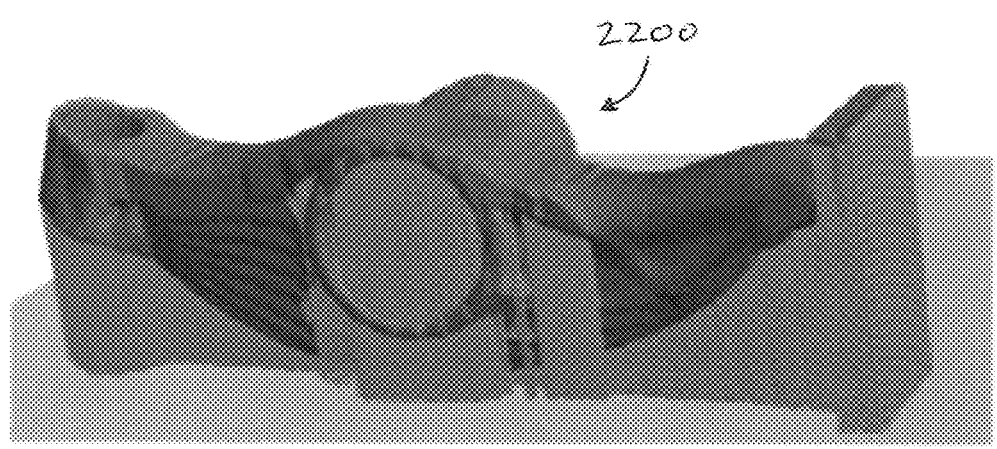
FIG. 22 is a computer-simulated diagram of a support volume sensitive topographical optimization of the automotive part of FIG. 18A, with an additive manufacturing build direction along the positive Y axis.
Figures 23, 24:
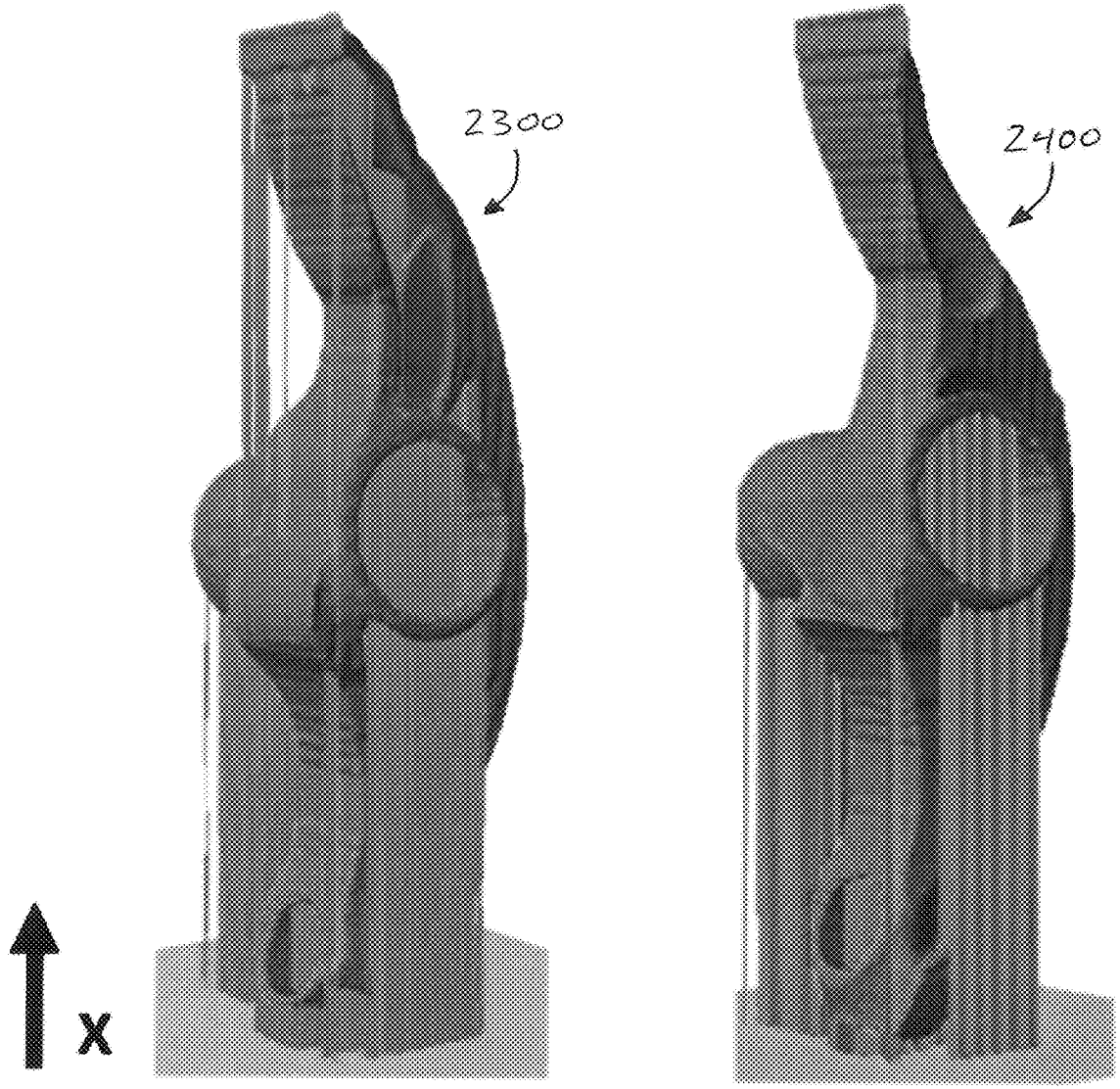
FIG. 23 is a computer-simulated diagram of an unconstrained topographical optimization of the automotive part of FIG. 18A, with an additive manufacturing build direction along the positive X axis.
FIG. 24 is a computer-simulated diagram of a support volume sensitive topographical optimization of the automotive part of FIG. 18A, with an additive manufacturing build direction along the positive X axis.

In another embodiment, the build direction for the rocker arm may be set to +Y, giving better surface quality to the smaller cylindrical hole 1802 (of FIG. 18). Solving the same optimization problem as before results in the unconstrained design 2100 in FIG. 21, and the constrained design (η=0.90) 2200 of FIG. 22. The support volume was reduced by 20%, while the compliance increased by 32%. In yet another embodiment, the build direction was set to +X; a justification for this direction can be better fusion between layers, since the print area is smaller than previous directions. From the unconstrained design 2300 of FIG. 23 to the constrained design (η=0.90) 2400 of FIG. 24, the support volume was reduced by 4%, while the compliance increased by 10%.

This disclosure provides a topology optimization framework that leads to designs with reduced support structures. Specifically, this disclosure introduces a novel topological sensitivity approach for constraining support structure volume during design optimization. The effectiveness of the proposed scheme was illustrated through several numerical examples, and demonstrated using FDM technology.

Support structures were assumed to be vertical for simplicity, but the methodology can be extended to handle non-vertical support structures. Additionally, the weighting proposed herein is simple and easy to implement. The framework may include other AM-related constraints, such as surface roughness, volumetric error, inter-layer fusion, and so on. The proposed method may be coupled with methods for finding the optimum build direction to further reduce support volume.

The information presented in Table 1 shows that the improvements in object design for AM via the present support volume sensitive TO framework do not impose significant additional computational cost on the system (e.g., the computing device 100 of FIG. 1) generating the optimized design. In particular, as the size of the problem and the support volume increases, the constrained problem requires more computational effort to compute support sensitivity field, yet for all of the presented experiments CPU time remains comparable. For reference, the information describes the exemplary optimizations presented herein, performed using a computing device with an 8-core Intel Core i7 CPU running at 3.00 GHz, 16 GB of memory, and the 64-bit version of the MICROSOFT WINDOWS 7 operating system.

TABLE 1

Computational Cost with and without Support Structure Constraint

| Example | Finite element degrees of freedom | CPU time Unconstrained | CPU time Support Constrained |
|---|---|---|---|
| MBB | 27,400 | 5.25 sec. | 5.5 sec. |
| Three-hole bracket | 45,012 | 10 sec. | (η = 0.75) 11 sec. (η = 0.50) 13.7 sec. |
| Mount bracket | 196,965 | 1 min 18 sec. | 1 min 29 sec. |
| Rocker Arm (−Z) | ~1.7 million | 28 min 30 sec. | 30 min 59 sec. |
| Rocker Arm (+Y) | ~1.7 million | 28 min 30 sec. | 32 min 6 sec. |
| Rocker Arm (+X) | ~1.7 million | 28 min 30 sec. | 30 min 14 sec. |

The present invention has been described in terms of one or more preferred embodiments, and it should be appreciated that many equivalents, alternatives, variations, and modifications, aside from those expressly stated, are possible and within the scope of the invention.

The invention claimed is:

1. A method for generating a topologically-optimized design of an object for additive manufacturing from a first design of the object, the object having a first volume of material when manufactured from the first design, the method comprising:

receiving electronic data comprising the first design of the object;

receiving a support constraint parameter having a value between zero and one;

determining a first support volume, the first support volume indicating a first volume of support structures required to support the object during the additive manufacturing, along a predetermined build direction, of the object from the first design;

performing a first topological optimization of the first design, the first topological optimization being unconstrained as to support volume, to produce a first unconstrained optimized design of the object, the object when manufactured from the first unconstrained optimized design, comprising a first fractional volume of material that is less than the first volume of material;

determining a first unconstrained support volume indicating a second volume of support structures required to support the object during the additive manufacturing, along the predetermined build direction, of the object from the first unconstrained optimized design;

computing, for each corresponding topological change of a set of topological changes between the initial design and the unconstrained optimized design:

a first topological sensitivity value that indicates a sensitivity of a performance metric of the object to the corresponding topological change between the first design and the first unconstrained optimized design, to produce a set of first topological sensitivities; and a second topological sensitivity value that indicates a sensitivity of support structure volume required to perform the additive manufacturing of the object in the predetermined build direction to the corresponding topological change between the first design and the first unconstrained optimized design, to produce a set of second topological sensitivities;

computing a first augmented topological field comprising a plurality of scalar values each associated with a corresponding location of one of the set of topological changes, each of the plurality of scalar values determined by combining the first topological sensitivity value and the second topological sensitivity value at coordinates corresponding to the corresponding location; and performing a fixed-point iteration of the first design based on the first augmented topological field to produce a first intermediate design of a plurality of intermediate designs, wherein the first intermediate design comprises the first fractional volume of material and has a first optimized support volume less than or equal to the first unconstrained support volume multiplied by the support constraint parameter.

2. The method of claim 1, wherein computing the set of second topological sensitivities comprises, for each of the set of topological changes between the first design and the first unconstrained optimized design, determining a corresponding change to the support structure volume at each point of a plurality of points within the first design that have a corresponding surface normal disposed at an angle from the predetermined build direction that exceeds a threshold angle.

3. The method of claim 2, wherein computing the set of second topological sensitivities further comprises smoothing corresponding second topological sensitivity values based on a horizontal overhang distance of each overhang of one or more overhangs in the first design.

4. The method of claim 1, wherein computing the first augmented topological field comprises combining a first sensitivity field corresponding to the set of first topological sensitivities with a second sensitivity field corresponding to the set of second topological sensitivities according to an augmented Lagrangian method to produce the first augmented topological field.

5. The method of claim 1, further comprising:
receiving a target fractional volume that is less than the first fractional volume;
performing the first topological optimization of the first unconstrained optimized design to produce a second unconstrained optimized design, the object in the first unconstrained optimized design comprising the target fractional volume of material;
determining a second unconstrained support volume indicating a third volume of support structures required to support the object during the additive manufacturing, along the predetermined build direction, of the object from the second unconstrained optimized design;
computing, for each corresponding topological change of a set of proposed topological changes between the first intermediate design and the second unconstrained optimized design:
a third topological sensitivity value that indicates a sensitivity of the performance metric of the object to the corresponding proposed topological change, to produce a set of third topological sensitivities; and
a fourth topological sensitivity value that indicates a sensitivity of the support structure volume required to perform the additive manufacturing of the object along the predetermined build direction to the corresponding proposed topological change, to produce a set of fourth topological sensitivities;
computing a second augmented topological field comprising a plurality of scalar values each associated with a corresponding location of one of the set of proposed topological changes, each of the plurality of scalar values determined by combining the third topological sensitivity value and the fourth topological sensitivity value at coordinates corresponding to the corresponding location; and
performing a fixed-point iteration of the first intermediate design based on the second augmented topological sensitivity field to produce a final optimized design, the object, when manufactured from the final optimized design, comprising the target fractional volume of material, and the support volume required for additive manufacturing, in the predetermined build direction, of the object from to the final optimized design being less than or equal to the second unconstrained support volume multiplied by the support constraint parameter.

6. A computing device, comprising:
memory storing device logic; and
a processor in communication with the memory and executing the device logic to:
receive an initial design of an object, the object having an initial volume of material in the initial design; and
iterate a topological optimization of the initial design in a build direction to produce a plurality of iterative designs of the object, the plurality of iterative designs including a final optimized design in which the object comprises a final volume of material that is a target fraction of the initial volume of material, wherein each of the iterative designs has a corresponding support volume of support structures required to support the object during additive manufacturing, in the build direction, of the object from the iterative design, the corresponding support volume constrained according to a support constraint parameter.

7. The computing device of claim 6, wherein the support constraint parameter is a number between zero and one.

8. The computing device of claim 7, wherein to iterate the topological optimization, the processor executes the device logic to:
perform an unconstrained topological optimization of the initial design, the first topological optimization being unconstrained as to support volume, to produce a first unconstrained iteration, the object in the first unconstrained iteration comprising a first fractional volume of material;
determine an unconstrained support volume of support structures required to support the object in the first unconstrained iteration during the additive manufacturing of the object from the first unconstrained iteration; and
perform the topological optimization of the initial design to produce a first iterative design of the plurality of iterative designs such that the corresponding support volume of the first iterative design is less than or equal to the unconstrained support volume multiplied by the support constraint parameter.

9. The computing device of claim 6, wherein to iterate the topological optimization, the processor further executes the device logic to:
compute, for each iterative design of the plurality of iterative designs, a corresponding topological sensitivity field for support structure volume; and
determine, based on the corresponding topological sensitivity field, a corresponding topology of the iterative design.

10. The computing device of claim 9, wherein the corresponding topological sensitivity field for support structure volume for a first iterative design of the plurality of iterative designs is based on a corresponding surface angle of a plurality of points within the first iterative design, the corresponding surface angle of each of the plurality of points exceeding a threshold angle.

11. The computing device of claim 10, wherein the threshold angle is $3\pi/4$.

12. The computing device of claim 10, wherein the corresponding topological sensitivity field for support structure volume for a first iterative design of the plurality of iterative designs is further based on an overhang horizontal distance at one or more of the plurality of points.

13. The computing device of claim 9, wherein to iterate the topological optimization, the processor further executes the device logic to compute, for each iterative design of the plurality of iterative designs:
a corresponding topological sensitivity field for performance of the object in the iterative design; and
a corresponding augmented topological field based on the corresponding topological sensitivity field for performance and the corresponding sensitivity field for support structure volume;
the corresponding topology of each iterative design being further based on the corresponding augmented topological field.

14. The computing device of claim 13, wherein the corresponding augmented topological field of each iterative design of the plurality of iterative designs is computed using an augmented Lagrangian method that combines the corresponding topological sensitivity field for performance and the corresponding topological sensitivity field for support structure volume.

15. The computing device of claim 13, wherein the corresponding topology of a first iterative design of the plurality of iterative designs comprises a fixed-point iteration of the initial design based on the corresponding augmented topological field.

16. A method for optimizing an object for additive manufacturing, the method comprising:
receiving an initial design of an object, the object having an initial volume of material in the initial design; and
iterating a topological optimization, based on a selected build direction, of the initial design to produce a plurality of iterative designs of the object, the plurality of iterative designs including a final optimized design in which the object comprises a final volume of material that is a target fraction of the initial volume of material, wherein each of the iterative designs has a corresponding support volume of support structures required to support the object during additive manufacturing, in the selected build direction, of the object from the iterative design, the corresponding support volume constrained according to a support constraint parameter.

17. The method of claim 16, wherein the support constraint parameter is a number between zero and one and iterating the topological optimization comprises:
performing an unconstrained topological optimization of the initial design, the first topological optimization being unconstrained as to support volume, to produce a first unconstrained iteration, the object in the first unconstrained iteration comprising a first fractional volume of material;
determining an unconstrained support volume of support structures required to support the object in the first unconstrained iteration during the additive manufacturing of the object from the first unconstrained iteration; and
performing the topological optimization of the initial design to produce a first iterative design of the plurality of iterative designs such that the corresponding support volume of the first iterative design is less than or equal to the unconstrained support volume multiplied by the support constraint parameter.

18. The method of claim 16, wherein iterating the topological optimization comprises:
computing, for each iterative design of the plurality of iterative designs, a corresponding topological sensitivity field for support structure volume; and
determining, based on the corresponding topological sensitivity field, a corresponding topology of the iterative design.

19. The method of claim 18, wherein iterating the topological optimization further comprises computing, for each iterative design of the plurality of iterative designs:
a corresponding topological sensitivity field for performance of the object in the iterative design; and
a corresponding augmented topological field based on the corresponding topological sensitivity field for performance and the corresponding sensitivity field for support structure volume;
the corresponding topology of each iterative design being further based on the corresponding augmented topological field.

20. The computing device of claim 19, wherein computing the corresponding augmented topological field of each iterative design of the plurality of iterative designs comprises using an augmented Lagrangian method to combine the corresponding topological sensitivity field for performance and the corresponding topological sensitivity field for support structure volume.

* * * * *